United States Patent
Ohara et al.

(10) Patent No.: US 9,647,261 B2
(45) Date of Patent: May 9, 2017

(54) NON-AQUEOUS ELECTROLYTE SECONDARY BATTERY

(71) Applicant: TOYOTA JIDOSHA KABUSHIKI KAISHA, Toyota-shi, Aichi (JP)

(72) Inventors: Keisuke Ohara, Osaka (JP); Tatsuya Hashimoto, Osaka (JP); Yuji Yokoyama, Moriguchi (JP); Yusuke Fukumoto, Toyonaka (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 177 days.

(21) Appl. No.: 14/440,369

(22) PCT Filed: Nov. 12, 2012

(86) PCT No.: PCT/JP2012/079307
§ 371 (c)(1),
(2) Date: May 4, 2015

(87) PCT Pub. No.: WO2014/073113
PCT Pub. Date: May 15, 2014

(65) Prior Publication Data
US 2015/0280209 A1    Oct. 1, 2015

(51) Int. Cl.
*H01M 4/13*  (2010.01)
*H01M 10/04* (2006.01)
(Continued)

(52) U.S. Cl.
CPC ......... *H01M 4/13* (2013.01); *H01M 10/0431* (2013.01); *H01M 10/0587* (2013.01);
(Continued)

(58) Field of Classification Search
CPC ............... H01M 10/0587; H01M 4/13; H01M 10/0431; H01M 4/131; H01M 4/505;
(Continued)

(56) References Cited

U.S. PATENT DOCUMENTS

2005/0031939 A1*  2/2005  Taguchi ............... H01M 4/242
                                              429/94
2009/0317721 A1* 12/2009  Shirane ................ H01M 4/13
                                              429/231.95
(Continued)

FOREIGN PATENT DOCUMENTS

JP          10-50298 A    2/1998
JP       2000-195556 A    7/2000
(Continued)

*Primary Examiner* — Muhammad Siddiquee
(74) *Attorney, Agent, or Firm* — Sughrue Mion, PLLC

(57) ABSTRACT

The present invention provides a non-aqueous electrolyte secondary battery that comprises a positive electrode sheet comprising a positive electrode active material layer, and a negative electrode sheet comprising a negative electrode active material layer. The positive electrode sheet and the negative electrode sheet are arranged such that the positive electrode active material layer and the negative electrode active material layer face each other. The negative electrode active material layer comprises a face-to-face region $N_F$ that faces the positive electrode active material layer and a non-face-to-face region $N_{NF}$ that does not face the positive electrode active material layer. The non-face-to-face region $N_{NF}$ includes a high density part $N_{HD}$ having a density higher than that of the region face-to-face $N_F$.

10 Claims, 5 Drawing Sheets

(51) Int. Cl.
*H01M 10/0587* (2010.01)
*H01M 4/131* (2010.01)
*H01M 4/505* (2010.01)
*H01M 4/525* (2010.01)
*H01M 10/0525* (2010.01)
*H01M 4/02* (2006.01)

(52) U.S. Cl.
CPC ............ *H01M 4/131* (2013.01); *H01M 4/505* (2013.01); *H01M 4/525* (2013.01); *H01M 10/0525* (2013.01); *H01M 2004/021* (2013.01); *H01M 2220/20* (2013.01); *Y02E 60/122* (2013.01)

(58) Field of Classification Search
CPC ............ H01M 4/525; H01M 2220/20; H01M 2004/021; H01M 10/0525; Y02T 10/7011
See application file for complete search history.

(56) References Cited

U.S. PATENT DOCUMENTS

| | | | |
|---|---|---|---|
| 2011/0117438 A1* | 5/2011 | Han | H01M 4/02 429/246 |
| 2011/0189546 A1* | 8/2011 | Ikeda | H01M 4/13 429/232 |
| 2013/0004853 A1* | 1/2013 | Wada | H01M 10/0422 429/233 |

FOREIGN PATENT DOCUMENTS

| | | |
|---|---|---|
| JP | 2001-35482 A | 2/2001 |
| JP | 2005-209411 A | 8/2005 |
| JP | 2010-33869 A | 2/2010 |
| JP | 2011-60520 A | 3/2011 |
| JP | 2011-124058 A | 6/2011 |
| JP | 2011-238568 A | 11/2011 |
| KR | 10-2011-0053275 A | 5/2011 |

* cited by examiner

NON-AQUEOUS ELECTROLYTE SECONDARY BATTERY

CROSS REFERENCE TO RELATED APPLICATIONS

This application is a National Stage of International Application No. PCT/JP2012/079307 filed Nov. 12, 2012, the contents of which are incorporated herein by reference in their entirety.

TECHNICAL FIELD

The present invention relates to a secondary battery (a non-aqueous electrolyte secondary battery) comprising a non-aqueous electrolyte. In particular, it relates to a non-aqueous electrolyte secondary battery that can be applied to a vehicle power supply.

BACKGROUND ART

Lithium-ion secondary batteries and other non-aqueous electrolyte secondary batteries have become increasingly important as power supplies installed in vehicles or as batteries for PCs and mobile devices, etc. In particular, lightweight lithium-ion secondary batteries with high energy density are highly important as high output power batteries to drive vehicles such as electric automobiles, hybrid automobiles and the like. Technical literatures related to non-aqueous electrolyte secondary batteries include Patent Documents 1 to 5.

CITATION LIST

Patent Literature

[Patent Document 1] Japanese Patent Application Publication No. 2010-033869
[Patent Document 2] Japanese Patent Application Publication No. 2000-195556
[Patent Document 3] Japanese Patent Application Publication No. 2001-035482
[Patent Document 4] Japanese Patent Application Publication No. H10-050298
[Patent Document 5] Japanese Patent Application Publication No. 2011-124058

SUMMARY OF INVENTION

Technical Problem

In a non-aqueous electrolyte secondary battery of this type, charging and discharging are mediated by cycling of charge carriers (Li ions in a lithium-ion secondary battery) between positive and negative electrode active materials. A typical example of the non-aqueous electrolyte secondary battery is a constitution having a positive electrode that comprises a positive electrode active material layer comprising a positive electrode active material and a negative electrode that comprises a negative electrode active material layer comprising a negative electrode active material. In particular, a constitution where the positive electrode active material layer and negative electrode active material layer on current collector sheets are placed opposite is preferable since it can be advantageous from the standpoint of the high output performance and rapid charging ability. In a means to increase the output power of a secondary battery, the density of a negative electrode active material layer is reduced. It is thought that with decreasing density of negative electrode active material layer, charge carriers can move more freely in the negative electrode active material layer, and the ability of the negative electrode active material layer to release the charge carriers can increase.

With respect to a secondary battery in an embodiment where the negative electrode active material layer partially includes a region (non-face-to-face region) that does not face the positive electrode active material layer, upon storage in a somewhat charged state, the post-storage discharge capacity may sometimes decrease. A possible cause for this may be the charge carriers in the negative electrode active material layer moving from a region (face-to-face region) that faces a positive electrode active material layer to the non-face-to-face region during the storage. Such phenomenon is particularly likely to occur at edges of a negative electrode active material layer. The charge carriers in the non-face-to-face region are less likely to be released from the negative electrode active material as compared with the charge carriers in the face-to-face region. Thus, the amount of available charge carriers may tend to decrease under certain discharging conditions (e.g. at a certain discharge rate). The transfer of charge carriers may cause a local overcharge and thereby cause dissolution of a metal species from the positive electrode active material as metal ions (e.g. manganese ions) different from the charge carriers. For instance, the dissolved metal ions may diffuse over to the negative electrode and precipitate out upon, for example, reaction with charge carriers on or around the negative electrode. Upon the reaction with metal ions, the charge carriers are likely to be irreversibly fixed and become unavailable for charging and discharging. When the temperature is elevated during storage, charge carriers can move more freely in the negative electrode active material layer. Thus, a storage-caused decrease in discharge capacity tends to be more likely to occur. For instance, with respect to a non-aqueous electrolyte secondary battery, such as a vehicle-driving battery, which is expected to be stored in a charged state for a long period and/or at a temperature that can be elevated and of which high output power is required, it is particularly important to reduce loss of capacity caused by storage.

The present invention is related to improving a non-aqueous electrolyte secondary battery, with an objective thereof being to provide a non-aqueous electrolyte secondary battery with which storage-caused loss of capacity is reduced.

Solution to Problem

To achieve the objective, the present invention provides a non-aqueous electrolyte secondary battery that comprises an electrode body comprising a positive electrode sheet and a negative electrode sheet. The positive electrode sheet comprises a positive current collector sheet, and a positive electrode active material layer placed on the positive current collector sheet. The negative electrode sheet comprises a negative current collector sheet, and a negative electrode active material layer placed on the negative current collector sheet. The positive electrode sheet and the negative electrode sheet are arranged such that the positive electrode active material layer and the negative electrode active material layer face each other. The negative electrode active material layer comprises a face-to-face region $N_F$ that faces the positive electrode active material layer and a non-face-to-face region $N_{NF}$ that does not face the positive electrode active material layer. The non-face-to-face region $N_{NF}$ comprises a high density part $N_{HD}$ having a higher density than the face-to-face region $N_F$. The non-aqueous electrolyte secondary battery can be, for instance, a lithium-ion secondary battery or any other lithium secondary battery.

According to such a constitution, the high density part $N_{HD}$ can serve as an area that yields relatively low moving rate and low insertion rate of charge carriers in the negative electrode active material layer. This can hinder the charge carriers from moving to the non-face-to-face region $N_{NF}$ to reduce storage-caused capacity loss. For instance, it can prevent or inhibit the occurrence of a local overcharge, which can take place when at least a certain amount of charge carriers move from the positive electrode active material layer to the negative electrode to compensate the charge carriers that have moved to the non-face-to-face region $N_{NF}$. The density of the high density part $N_{HD}$ and the density of the face-to-face region $N_F$ can be independently controlled. Accordingly, it is possible to reduce the storage-caused capacity loss by forming the high density part $N_{HD}$ in the non-face-to-face region $N_{NF}$ while bringing about higher output power by decreasing the density of the face-to-face region $N_F$. In other words, the constitution described above can bring about an effect that cannot be obtained in a constitution whose negative electrode active material layer has a uniform density throughout the entire layer just by adjusting the density. For instance, it can bring about an effect that combines higher output power and less storage-caused capacity loss at a high level.

In a preferable embodiment of the art disclosed herein, the non-face-to-face region $N_{NF}$ comprises an outer portion $NS_{OUT}$ placed on an outer surface of the negative current collector sheet that is located further outside the outermost positive electrode active material layer in the electrode body. The outer portion $NS_{OUT}$ includes the high density part $N_{HD}$. The high density part $N_{HD}$ is preferably arranged at least on a periphery of the outer portion $NS_{OUT}$.

With respect to the non-face-to-face region $N_{NF}$, charge carriers are particularly less likely to be released from the outer portion $NS_{OUT}$. According to this embodiment, since the outer portion $NS_{OUT}$ includes the high density part $N_{HD}$, charge carriers are hindered from moving into the outer portion $NS_{OUT}$. This can efficiently reduce capacity loss caused by storage. Charge carriers in the face-to-face region $N_F$ and metal ions dissolved from the positive electrode active material are thought to enter the outer portion $NS_{OUT}$ primarily from the periphery of the portion $NS_{OUT}$. Accordingly, by placing a high density part $N_{HD}$ at least on the periphery of the outer portion $N_{OUT}$, the storage-caused capacity loss can be effectively reduced.

In a preferable embodiment of the art disclosed herein, the non-face-to-face region $N_{NF}$ comprises an extra portion $N_E$ over which the region $N_{NF}$ spreads outward from the face-to-face region $N_F$. The extra portion $N_E$ includes the high density part $N_{HD}$.

The extra portion $N_E$ is not limited to this particular portion $N_E$. The corresponding opposite portion on the negative current collector sheet having the portion $N_E$ is also an extra portion $N_E$ (also a non-face-to-face region $N_{NF}$). Accordingly, it is preferable to arrange a high density part $N_{HD}$ in such an extra portion $N_E$ because the high density part $N_{HD}$ can be easily formed. For instance, when the negative electrode active material layer is formed and then compressed in the thickness direction to form a high density part $N_{HD}$, the high density part $N_{HD}$ can be formed without compressing the face-to-face region $N_F$ more than necessary.

In a preferable embodiment of the art disclosed herein, the non-face-to-face region $N_{NF}$ comprises an outer extra portion $NS_{OUTE}$. In other words, the portion $NS_{OUTE}$ is placed on an outer surface of the negative current collector sheet that is located further outside the outermost positive electrode active material layer in the electrode body, spreading outward from the face-to-face region $N_F$. The outer extra portion $NS_{OUTE}$ includes the high density part $N_{HD}$. Such an embodiment can bring about both the effect of the high density part $N_{HD}$ formed on the outer portion $NS_{OUT}$ and the effect of the same formed on the extra portion $N_E$. The outer extra portion $NS_{OUTE}$ is typically located on a periphery of the outer portion $NS_{OUT}$. This can further about the effect of the high density part $N_{HD}$ formed on the outer portion $NS_{OUT}$ to a greater extent.

In a preferable embodiment of the art disclosed herein, the high density part $N_{HD}$ is formed on a periphery of the negative electrode sheet. The periphery is covered on each face with the negative electrode active material layer up to the end edge (farthest edge) of the negative current collector sheet. In the non-aqueous electrolyte secondary battery in such an embodiment, for instance, as shown in FIG. 5, the negative current collector sheet has a negative electrode active material layer N1 placed on a first surface S1 thereof and a negative electrode active material layer N2 placed on a second surface S2 thereof, with the negative electrode active material layers N1 and N2 having edges $E_{N1}$ and $E_{N2}$ adjacently located at the end edge (of the negative current collector sheet), respectively. Thus, when the battery is in storage, etc., charge carriers may be likely to move between the edge $E_{N1}$ of negative electrode active material layer N1 and the edge $E_{N2}$ of negative electrode active material layer N2. Thus, it is greatly significant to apply the constitution disclosed herein to hinder the charge carries from moving. Charge carries are likely to move from the edge $E_{N2}$ to the edge $E_{N1}$ particularly when the end edge is located further outside the outermost positive electrode active material layer in the electrode body, with the surface S1 facing outward and the surface S2 facing inward. Therefore, it is particularly meaningful to apply the art disclosed herein.

In a preferable embodiment of the art disclosed herein, the non-face-to-face region $N_{NF}$ comprises an extra portion $N_E$ that spreads outward from the face-to-face region $N_F$, and the extra portion $N_E$ comprises a line of high density part (a high density line) $N_{HD}$ that extends alongside the proximal edge of the face-to-face region $N_F$.

As used herein, between the outer edges of the face-to-face region $N_F$, the proximal edge of the face-to-face region $N_F$ refers to the edge closer to the non-face-to-face region $N_{NF}$ that includes the high density part $N_{HD}$. The proximal edge of the face-to-face region $N_F$ typically coincides with the border between the face-to-face region $N_F$ and the non-face-to-face region $N_{NF}$ that includes the high density part $N_{HD}$.

According to such an embodiment, because the high density part $N_{HD}$ is arranged to extend across pathways for the charge carriers to move from the proximal edge of the face-to-face region $N_F$ to the extra portion $N_E$, charge carriers can be effectively hindered from moving from the face-to-face region $N_F$ to the extra portion $N_E$. The line of high density part $N_{HD}$ is preferably arranged such that the direction of the extending proximal edge and the direction of the extending line of high density part $N_{HD}$ form an angle less than 45 degrees (preferably less than 30 degrees, e.g. less than 15 degrees). For instance, the proximal edge of the face-to-face region $N_F$ and the high density part $N_{HD}$ can be arranged to extend in parallel.

The extra portion $N_E$ may comprise a plurality of lines of high density part $N_{HD}$ extending alongside the proximal edge of the face-to-face region $N_F$, or may comprise only a single line thereof. In an embodiment comprising a plurality of lines of high density part $N_{HD}$, these lines of high density part $N_{HD}$ are preferably formed in parallel with one another. The art disclosed herein can be preferably implemented, for instance, in an embodiment comprising a plurality of parallel lines of high density part $N_{HD}$ being arranged to extend in parallel with the proximal edge of the face-to-face region $N_F$.

The high density part $N_{HD}$ can be formed by applying a negative electrode active material layer-forming composition to the negative current collector sheet, drying the composition applied, and locally pressing the dried composition. According to such an embodiment, by applying local pressure to compress a part in the dried composition that corresponds to the high density part $N_{HD}$, a negative electrode sheet can be easily fabricated, having the high density part $N_{HD}$ of a desirable density formed in a desirable place.

In a preferable embodiment of the non-aqueous electrolyte secondary battery disclosed herein, the positive electrode sheet and the negative electrode sheet are both long in length. The electrode body is a wound electrode body in an embodiment where the positive electrode sheet and the negative electrode sheet are overlaid and wound in the length direction. The art disclosed herein can be preferably implemented in an embodiment of a non-aqueous electrolyte secondary battery (e.g. a lithium-ion secondary battery) comprising such a wound electrode body.

The non-aqueous electrolyte secondary battery disclosed herein is less susceptible to capacity loss during storage at a high temperature and has a constitution suitable for producing higher output power. Accordingly, with the benefit of these features, it can be preferably used as a secondary battery such as a driving power source in a vehicle such as a hybrid vehicle (HV), plug-in hybrid vehicle (PHV), electric vehicle (EV), etc. The present description provides a vehicle equipped with a non-aqueous electrolyte secondary battery (e.g. a lithium-ion secondary battery) disclosed herein. Such a vehicle may comprise a multi-cell battery in which a plurality of the non-aqueous electrolyte secondary batteries are electrically connected.

DESCRIPTION OF EMBODIMENTS

Figure 1:
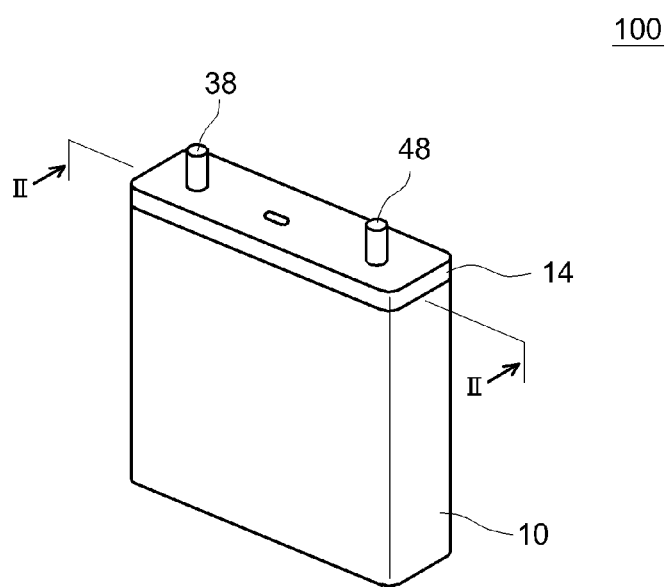
FIG. 1 shows a perspective view schematically illustrating the appearance of the non-aqueous electrolyte secondary battery according to an embodiment.

While referring to drawings, an embodiment of the present invention is described below. The dimensional relationships (of length, width, thickness, etc.) in each drawing do not represent actual dimensional relationships. Matters necessary to practice this invention other than those specifically referred to in this description may be understood as design matters based on the conventional art in the pertinent field to a person of ordinary skills in the art. The present invention can be practiced based on the contents disclosed in this description and common technical knowledge in the subject field. In the drawings referenced below, a common reference numeral may be assigned to members or sites producing the same effect, and duplicated descriptions are sometimes omitted or simplified.

As used herein, the term "secondary battery" refers to a rechargeable electric storage device in general and includes so-called storage batteries such as lithium secondary batteries and the like as well as power storage elements such as electric double-layer capacitors and the like. The term "non-aqueous electrolyte secondary battery" refers to a battery comprising a non-aqueous electrolyte. The non-aqueous electrolyte can be typically in an embodiment comprising a supporting salt (supporting electrolyte) in a non-aqueous solvent. The non-aqueous electrolyte may be typically an electrolyte in a liquid form at ambient temperature (e.g. 25° C.), that is, a non-aqueous electrolyte solution.

As used herein, the term "lithium secondary battery" refers to a secondary battery that uses Li ions as electrolytic ions, and charges and discharges by transfer of charges associated with lithium ions between the positive and negative electrodes. Secondary batteries generally called lithium-ion secondary batteries, lithium-ion capacitors and the like are typical examples included in the lithium secondary battery in the present description.

As used herein, the term "active material" refers to a substance capable of reversely storing and releasing (typically, intercalating and de-intercalating) a chemical species that acts as a charge carrier in a secondary battery In a lithium secondary battery (e.g. lithium-ion secondary battery), the chemical species serving as the charge carrier is primarily lithium ions.

Unless otherwise specified, the term "SOC" (state of charge) in the present description refers to the state of charge of a battery based on the typical voltage range over which the battery is used. For example, in a battery used at a voltage across the terminals (open circuit voltage or OCV) of 4.1 V (upper voltage limit) to 3.0 V (lower voltage limit), the SOC refers to the state of charge based on the rated capacity measured over the same voltage range.

As used herein, "1 C" means a current value that allows a fully-charged battery (100% SOC) to discharge to its discharge end voltage (0% SOC) in one hour.

In the present description, the term "average diameter" refers to a median diameter (D50) in a volume-based size distribution obtained with a general laser scattering/diffractometry analyzer unless otherwise specified.

With examples applying the art disclosed herein to lithium secondary batteries, preferable embodiments of the art are described below. The art disclosed herein is not, however, limited to the lithium secondary batteries.

Figure 2:
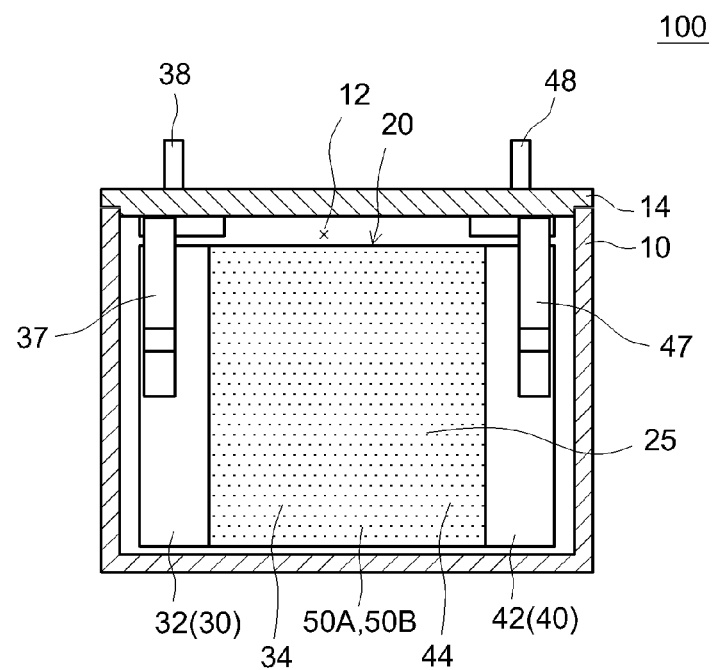
FIG. 2 shows a cross-sectional view taken along the line II-II in FIG. 1.

As shown in FIG. 1 and FIG. 2, a lithium secondary battery 100 comprises a flat square box-shape battery case 10 and a wound electrode body 20 contained in the battery case 10. Battery case 10 has an opening 12 on the top face. After wound electrode body 20 is placed via opening 12 into battery case 10, the opening 12 is sealed with a lid 14. Battery case 10 further contains a non-aqueous electrolyte (non-aqueous electrolyte solution) 25. Lid 14 is provided with an outer positive terminal 38 and an outer negative terminal 48 for external connections. Terminals 38 and 48 partially protrude from the surface of lid 14. Part of outer positive terminal 38 is connected to an inner positive terminal 37 inside the battery case 10 while part of outer negative terminal 48 is connected to an inner negative terminal 47 inside the battery case 10.

Figure 3:
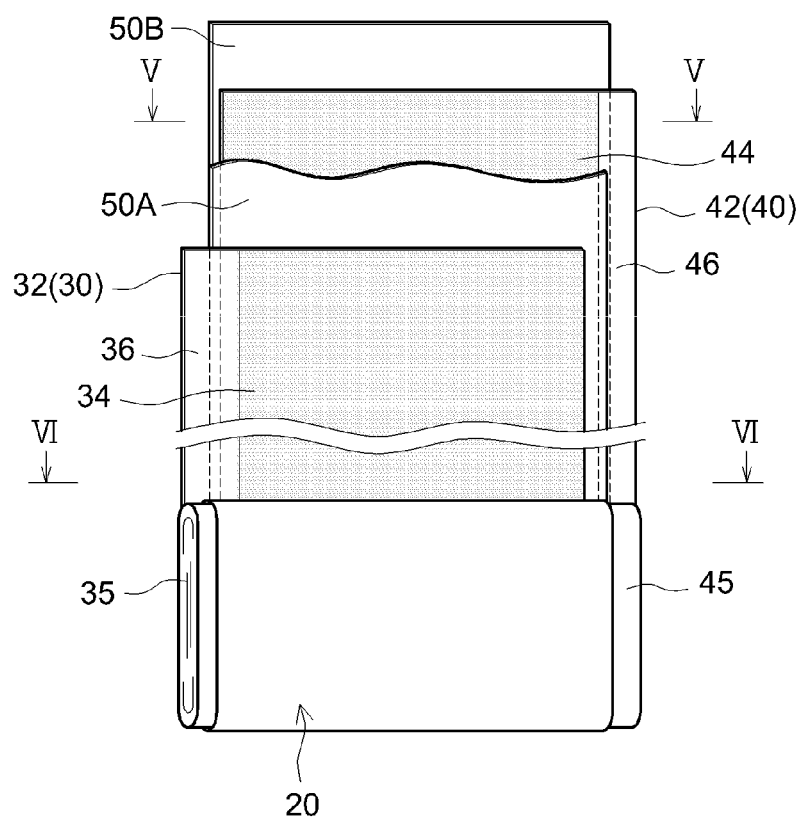
FIG. 3 shows a perspective view schematically illustrating the state of an electrode body according to an embodiment being prepared by means of winding.

As shown in FIG. 3, wound electrode body 20 comprises a long sheet of a positive electrode (positive electrode sheet) 30 and a long sheet of a negative electrode (negative electrode sheet) 40. Positive electrode sheet 30 comprises a long sheet of a positive current collector (positive current collector sheet) 32 and a positive electrode active material layer 34 formed above at least one (typically each) face thereof. Negative electrode sheet 40 comprises a long sheet of a negative current collector (negative current collector sheet) 42 and a negative electrode active material layer 44 formed above at least one (typically each) face thereof. Wound electrode body 20 further comprises two long sheets of separator (separator sheets) 50 A and 50B. Positive electrode sheet 30 and negative electrode sheet 40 are layered via two separator sheets 50A and 50B, in the order of positive electrode sheet 30, separator sheet 50A, negative electrode sheet 40 and separator sheet 50B. The layered body is wound in the length direction to form a wound body. The wound body is then laterally compressed and flattened to form a flat shape.

The electrode body is not limited to a wound electrode body. Depending on the shape and purpose of the battery, it may have a suitable shape and constitution such as a laminate form, etc.

On the wound electrode body 20, there is formed centrally widthwise (perpendicularly to the winding direction) a portion where the positive electrode material layer 34 formed above the surface of positive current collector sheet 32 and negative electrode active material layer 44 formed above the surface of negative current collector sheet 42 are thickly laminated in layers. In positive electrode sheet 30, one edge across the width direction is provided with a portion where positive current collector sheet 32 is exposed with no positive electrode active material layer 34 formed thereon (positive electrode active material layer-free portion 36). The positive electrode active material layer-free portion 36 protrudes from separator sheets 50A, 50B and negative electrode sheet 40, that is, it extends beyond separator sheets 50A, 50B and negative electrode sheet 40. Because of this, in wound electrode body 20, on one edge of the width direction, there is formed a positive current collector sheet self-overlapping portion 35 where the positive electrode active material layer-free portion 36 of positive current collector sheet 32 overlaps with itself. On the other edge across the width direction in wound electrode body 20, there is formed also a negative current collector sheet-overlapping portion 45 where the negative electrode active material layer-free portion 46 of negative current collector sheet 42 overlaps with itself. The positive current collector sheet self-overlapping portion 35 is brought closer at a middle part and electrically connected to inner positive terminal 37 shown in FIG. 2 by means of welding, etc. Similarly, the negative current collector sheet self-overlapping portion 45 is also electrically connected to inner negative terminal 47.

Figure 4:
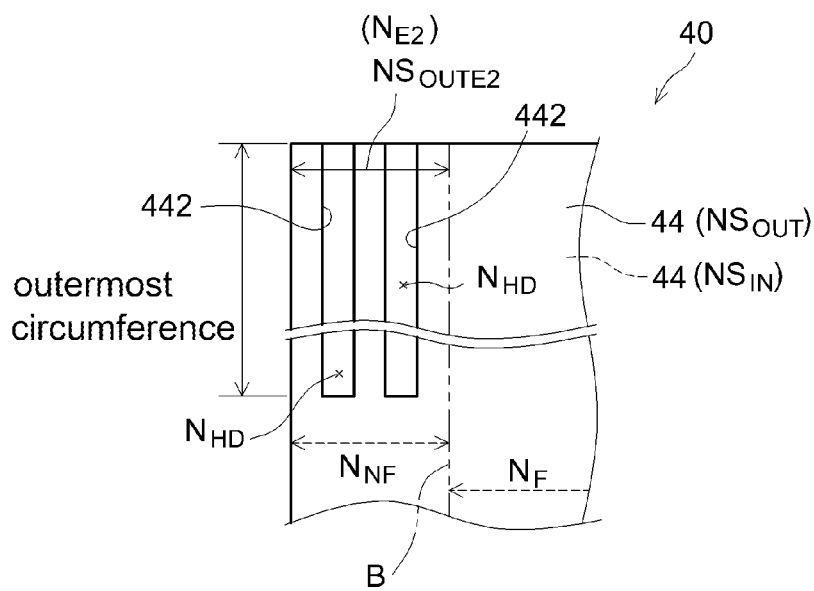
FIG. 4 shows an enlarged plan view schematically illustrating part of the negative electrode sheet shown in FIG. 3.
Figure 5:
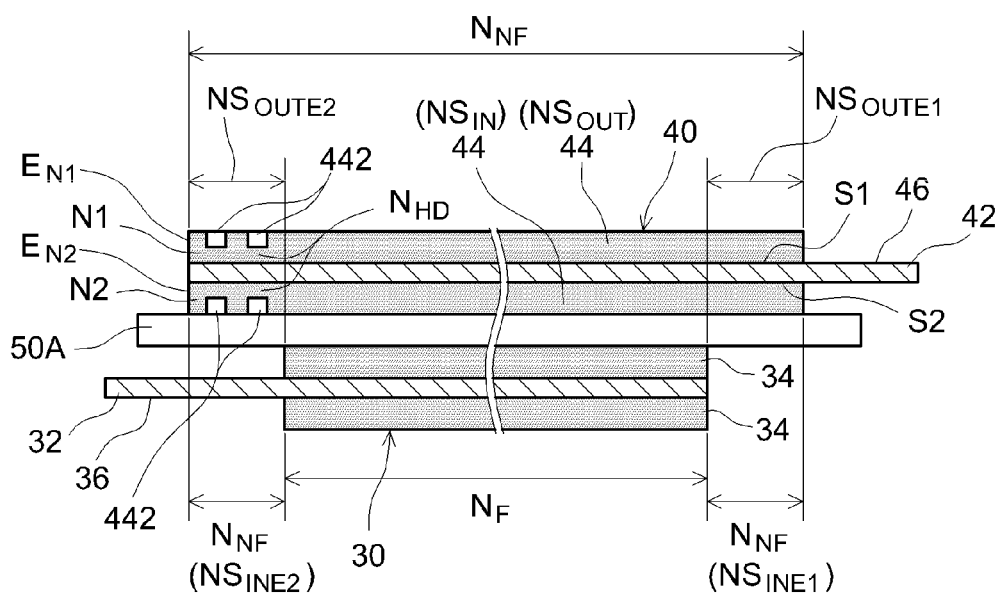
FIG. 5 shows a cross-sectional view taken along the line V-V in FIG. 3.
Figure 6:
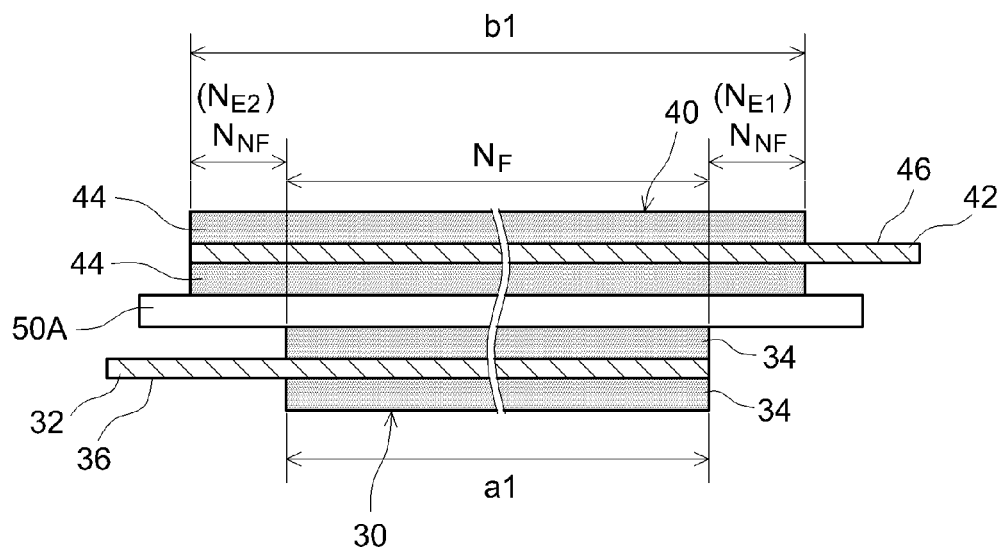
FIG. 6 shows a cross-sectional view taken along the line VI-VI in FIG. 3.

In a state where the positive electrode sheet 30 and negative electrode sheet 40 are overlaid and wound, as shown in FIGS. 4, 5 and 6, the negative electrode active material layers 44 comprise a region (face-to-face region) $N_F$ that faces the positive electrode active material layer 34 and a region (non-face-to-face region) $N_{NF}$ that does not face the positive electrode active material layer 34. The non-face-to-face region $N_{NF}$ comprises a high density part $N_{HD}$ at least partially.

In the present description, that "positive electrode active material layer and negative electrode active material layer face one another" naturally encompasses that the two layers face (oppose) each other across a separator, etc.

As shown in FIG. 6, negative electrode active material layer 44 is constituted (formed) to have a width b1 larger than the width a1 of positive electrode active material layer 34. Accordingly, when the positive electrode active material layer 34 and negative electrode active material layer 44 are overlaid, at least an edge of the width direction in the negative electrode active material layer 44 forms a portion (extra portion) $N_E$ that does not face the positive electrode active material layer 34, but spread outward from the edge of the width direction of the positive electrode active material layer 34. It is usually preferable that the positive electrode sheet 30 and negative electrode sheet 40 are arranged so that the positive electrode active material layer 34 is located in the central portion of the width direction of the negative electrode active material layer 44. In other words, as well depicted in FIG. 6, positive electrode sheet 30 and negative electrode sheet 40 should preferably be overlaid so that a first edge (negative electrode active material layer-free edge) of the width direction of negative electrode active material layer 44 and a second edge (on the side where the positive electrode active material layer is formed up to the end edge of the negative current collector sheet) thereof form an extra portion $N_{E1}$ and another extra portion $N_{E2}$, respectively, with each of the extra portions spreading outward from the positive electrode active material layer 34.

Herein, as shown in FIGS. 3 and 5, in wound electrode body 20, the negative electrode sheet 40 is placed on the outer circumference side relative to the positive electrode sheet 30. The outermost circumference of negative electrode sheet 40 is located further outside (on the outer circumference side relative to) the outermost positive electrode active material layer 34 in the electrode body 20. With respect to the negative current collector sheet 42 on the outermost circumference, the negative electrode active material layer 44 (N1) placed on the outer surface S1 and negative electrode active material layer 44 (N2) placed on the inner surface S2 make an outer portion $NS_{OUT}$ and an inner portion $NS_{IN}$.

In view that the entire range of outer portion $NS_{OUT}$ is a non-face-to-face region $N_{NF}$, the outer portion $NS_{OUT}$ is different from the inner portion $NS_{IN}$ and portions of the negative electrode active material layer 44 located further inside the outermost circumference in the negative electrode sheet 40. The inner portion $NS_{IN}$ comprises extra portions (inner extra portions) $NS_{INE1}$ and $NS_{INE2}$, and the outer portion $NS_{OUT}$ comprises outer extra portions $NS_{OUTE1}$ and $NS_{OUTE2}$ on the opposite face from the inner extra portions. In the examples shown in FIG. 3 to FIG. 6, the outer extra portion $NS_{OUTE2}$ and inner extra portion $NS_{INE2}$ include high density parts $N_{HD}$ at least partially. More specifically, as shown in FIGS. 4 and 5, from the outer circumference end (terminus) of the negative electrode sheet over a length corresponding to the length of the outermost circumference of wound electrode body 20, two straight lines of compression grooves 442 are formed in locations corresponding to the outer extra portion $NS_{OUTE2}$ and inner extra portion $NS_{INE2}$, with the grooves extending in parallel with the proximal edge B of the face-to-face region $N_F$. The bottoms of these compression grooves 422 are high density parts $N_{HD}$ each having a higher density than the face-to-face region $N_F$.

Herein, that the high density part $N_{HD}$ has a higher density than the face-to-face region $N_F$ indicates that the high density part $N_{HD}$ has a density $\rho N_{HD}$ and the face-to-face region $N_F$ has a density $\rho N_F$, satisfying the inequality $\rho N_{HD}/\rho N_F > 1$. When the density of face-to-face region $N_F$ is not uniform, it indicates that the face-to-face region $N_F$ has an average density that satisfies the inequality in relation to the density $\rho N_{HD}$ of high density part $N_{HD}$. The density (bulk density) of a negative electrode active material layer can be determined, for instance, based on the mass and thickness of the negative electrode active material layer formed on a unit surface area of a negative current collector sheet. Usually, $\rho N_{HD}/\rho N_F$ is preferably 1.20 or greater, or more preferably 1.30 or greater, for instance, 1.40 or greater. In a preferable embodiment of the art disclosed herein, $\rho N_{HD}/\rho N_F$ can be 1.45 or greater, or even 1.48 or greater (e.g. 1.50 or greater). Although not particularly limited, from the standpoint of facilitating the operation (e.g. compressing) to form the high density part $N_{HD}$ or reducing damage to the negative current collector sheet, $\rho N_{HD}/\rho N_F$ is usually suitably less than 5, preferably 3 or less, or more preferably 2 or less. In a preferable embodiment of the art disclosed herein, $\rho N_{HD}/\rho N_F$ can be less than 1.63, or even 1.60 or less (e.g. 1.56 or less). The art disclosed herein can be preferably implemented in an embodiment where the density $\rho N_{HD}$ of high density part $N_{HD}$ and the density $\rho N_F$ of face-to-face region $N_F$ satisfy a relationship $1.30 \leq \rho N_{HD}/\rho N_F \leq 1.63$ (more preferably $1.40 \leq \rho N_{HD}/\rho N_F \leq 1.60$, more preferably $1.85 \leq \rho N_{HD}/\rho N_F \leq 1.60$). This relationship can be preferably applied, for instance, to an embodiment using carbon particles described later as the negative electrode active material.

Preferable values (a preferable range) of density $\rho N_{HD}$ of high density part $N_{HD}$ can vary depending on the nature of the negative electrode active material, etc. It is usually suitably 1.85 g/cm³ or larger or can also be 1.90 g/cm³ or larger (e.g. 1.95 g/cm³ or larger). Although not particularly limited, in view of facilitating the operation (e.g. compressing) to form a high density part $N_{HD}$ or reducing damage to the negative current collector sheet, $\rho N_{HD}$ is usually suitably smaller than 5 g/cm³, preferably 3 g/cm³ or smaller, or more preferably 2.5 g/cm³ or smaller. In a preferable embodiment of the art disclosed herein, $\rho N_{HD}$ can be smaller than 2.10 g/cm³ or can be even 2.05 g/cm³ or smaller (e.g. 2.01 g/cm³ or smaller). The art disclosed herein can be preferably implemented in an embodiment where the density $\rho N_{HD}$ (g/cm³) of high density part $N_{HD}$ satisfies $1.50 \leq \rho N_{HD} < 2.10$ (more preferably $1.80 \leq \rho N_{HD} \leq 2.05$, more preferably $1.85 \leq \rho N_{HD} \leq 2.05$). These $\rho N_{HD}$ values can be preferably applied, for instance, to an embodiment using carbon particles as the negative electrode active material.

Preferable values of density $\rho N_F$ of the face-to-face region $N_F$ can vary depending on the purpose (target performance level) of the battery and the nature of the negative electrode active material, etc. In view of balancing output performance and energy density, it is usually suitably about 0.5 g/cm³ to 1.5 g/cm³, preferably 0.7 g/cm³ to 1.45 g/cm³, or more preferably 0.9 g/cm³ to 1.40 g/cm³ (e.g. 1.1 g/cm³ to 1.35 g/cm³). These $\rho N_F$ values can be particularly preferably applied, for instance, to an embodiment using carbon particles or a material having a similar true density as the negative electrode active material. It is noted that the graphite powder used as the negative electrode active material in worked examples described later has a true density of about 2.26 g/cm³.

In an embodiment where the first and second edges of width direction of negative electrode active material layer 44 are an extra portion $N_{E1}$ and an extra portion $N_{E2}$, respectively, the widths of extra portions $N_{E1}$ and $N_{E2}$ can be suitably selected in view of the ease of production management and energy density, etc. Preferable widths of extra portions $N_{E1}$ and $N_{E2}$ may vary depending on the battery size, etc. They are usually 10.0 mm or smaller, preferably 5.0 mm or smaller, or more preferably 4.0 mm or smaller, for instance, 3.0 mm or smaller. With respect to the extra portion including the high density part $N_{HD}$ (extra portions $NS_{INE2}$ and $NS_{OUT2}$ in the example shown in FIG. 5), from the standpoint of facile formation of the high density part $N_{HD}$, etc., the width of extra portion is suitably 0.5 mm or larger, preferably 1.0 mm or larger, or more preferably 1.5 mm or larger, for instance, 2.0 mm or larger. In a preferable embodiment, the extra portion has a width of 0.5 mm to 5.0 mm (more preferably 1.0 mm to 4.0 mm, yet more preferably 1.5 mm to 3.5 mm, e.g. 2.0 mm to 3.0 mm) on the edge where, in the width direction of the negative electrode active material layer, the negative electrode active material is formed up to the end edge of the negative current collector sheet.

When the first edge and/or the second edge of the width direction of the negative electrode active material layer includes extra portions, the extra portions can be provided over the entire length of the negative electrode sheet or can be provided as continuous or discontinuous portions over a partial length of the negative electrode sheet.

The high density $N_{HD}$-containing extra portion may include several separate high density parts $N_{HD}$ or a single high density part $N_{HD}$. For instance, in an extra portion including the high density part $N_{HD}$ in a form of line(s) (typically straight line(s)), the number of high density lines $N_{HD}$ in the extra portion may be one as exemplified in FIG. 7, two as exemplified in FIG. 4 and FIG. 5, or more than two. In an embodiment having the high density part $N_{HD}$ in a form of line(s), the width of high density part (the width per line) is not particularly limited. From the standpoint of facilitating production management or enabling the high density line $N_{HD}$ to function appropriately, it is usually suitably 0.1 mm or greater, or preferably 0.2 mm or greater (e.g. 0.3 mm or greater). From the standpoint of facilitating the operation (e.g. compressing) to form the high density part $N_{HD}$ or reducing the influence of the operation on the shape of negative electrode sheet (e.g. preventing flexural deformation), etc., the width of high density part (width per line) is suitably 3.0 mm or smaller, preferably 2.0 mm or smaller, or more preferably 1.5 mm or smaller (e.g. 1.0 mm or smaller). When a higher surface area ratio of high density part in the extra portion is desired, the high density part is preferably formed as a plurality of separate lines. When the plurality of high density lines are formed, these high density lines are preferably arranged in parallel to each other.

The high density part $N_{HD}$ can be formed so that the surface area ratio of high density part $N_{HD}$ in the surface area of the extra portion provided with the high density part $N_{HD}$ (extra portions $NS_{INE2}$ and $NS_{OUT2}$ in the example shown in FIG. 5) is 10% or greater (more preferably 15% or greater, e.g. 20% or greater). As shown in FIG. 4 and FIG. 5, in an embodiment having extra portions $NS_{INE2}$ and $NS_{OUTE2}$ each including a line of high density part $N_{HD}$ extending in the length direction of the negative electrode sheet, the high density parts $N_{HD}$ on the respective faces should preferably account for 10% or more (more preferably 15% or more, e.g. 20% or more) of the widths of extra portions $NS_{INE2}$ and $NS_{OUTE2}$, respectively. The high density part $N_{HD}$ can be formed over the entire width. Preferable results can be obtained when the high density part $N_{HD}$ is formed over 20% to 90% (e.g. 30% to 85%) of width of the extra portion. The art disclosed herein can be preferably implemented, for instance, in an embodiment where the high density $N_{HD}$ is formed over 50% to 80% of the width of extra portion.

The art disclosed herein can be implemented in an embodiment where the high density part $N_{HD}$ is formed only over a range equivalent to the length of the outermost circumference of negative electrode sheet 40. A preferable example of such an embodiment is illustrated in FIG. 3 to FIG. 6. In this embodiment, the outer extra portion $NS_{OUTE2}$ of negative electrode active material layer 44 and the inner extra portion $NS_{INE2}$ corresponding to the back face of the first are provided each with two high density lines $N_{HD}$ extending in the length direction of negative electrode sheet 40. These high density lines $N_{HD}$ are arranged in parallel to one another alongside the width centers of extra portions $NS_{OUTE2}$ and $NS_{INE2}$. The extra portions $NS_{OUTE2}$ and $NS_{INE2}$ are on the edge where negative electrode active material layers 44 are formed up to the end edge of negative current collector sheet 42.

The high density part $N_{HD}$ can be arranged to include the end edge of width direction of the negative current collector sheet, or, for instance, as shown in FIG. 3 to FIG. 6, it can be arranged at some distance from the end edge of negative current collector sheet 42. From the standpoint of facilitating the production, etc., the high density part $N_{HD}$ is preferably formed at about 0.05 mm to 2.0 mm (more preferably 0.1 mm to 1.5 mm) away from the end edge, extending approximately in parallel with the end edge. The same applies to the distance from the proximal edge (line B in FIG. 4) of the face-to-face region $N_F$ to the high density part $N_{HD}$.

Examples of modification made on the example illustrated in FIG. 3 to FIG. 6 include the following: the high density part $N_{HD}$ being formed in a single line, or in three or more lines; the linear high density part $N_{HD}$ being formed in portions $NS_{OUTE1}$ and $NS_{INE1}$ instead of portions $NS_{OUTE2}$ and $NS_{INE2}$, or in each of portions $NS_{OUTE2}$, $NS_{INE2}$, $NS_{OUTE1}$ and $NS_{INE1}$; the linear high density part $N_{HD}$ being formed to extend beyond the length of the outermost circumference of electrode body 20 in negative electrode sheet 40 so as to further extend over a portion that forms an inner circumference (e.g. to extend over the entire length of negative current collector sheet 42); high density lines $N_{HD}$ are being formed asymmetrically between the first and second faces of negative current collector sheet 42 (e.g. in such a way that the high density parts (lines) $N_{HD}$ differ in at least one of the following: location, shape, number of lines and density); and so on. The high density part can be in a form combining these modification examples.

As in the examples shown in FIG. 3 to FIG. 6, the negative electrode active material layer 44 may be compressed over a linear part extending in the length direction of negative electrode sheet 40 to form high density grooves $N_{HD}$ (compression grooves 442), whereby the high density part $N_{HD}$ in a form of grooves (compression grooves) forms a bonnet structure capable of structurally strengthening the wound electrode body 20 that is wound including the negative electrode sheet 40 with these grooves. Through this means, for instance, when an elliptically wound body is pressed (compressed) in the minor axis direction of the ellipse and molded into a flat shape, the following effects can be expected: a shortened time required for the molding, reduced spring-back of the wound body after the pressure is released, and so on (i.e. effects to help keep the wound state).

As shown in FIG. 6, separator 50A has a width larger than the width b1 of negative electrode active material layer 44. Separator 50A is arranged so that the margin extending beyond the width b1 of negative electrode active material layer 44 is arranged between layers of positive electrode active material layer 34 and negative electrode active material layer 44 to prevent an internal short circuit caused by direct contact between the positive electrode active material layer 34 and negative electrode active material layer 44. Separator 50B is constituted and arranged in the same manner as separator 50A. The negative electrode active material layer 44 is not necessarily wider than the positive electrode active material layer 34 and should just be arranged so that its major part faces the positive electrode active material layer 34 and the rest does not face the positive electrode active material layer 34.

The respective components constituting the lithium secondary battery are described next.

As the positive current collector sheet constituting the positive electrode in the lithium secondary battery, a conductive material formed of a metal having good conductivity can be preferably used. As such a conductive material, for example, can be used aluminum or an alloy containing aluminum as the primary component. The positive current collector sheet may have a variety of shapes such as a sheet, foil, mesh, and so on without particular limitations. The thickness of positive current collector sheet is not particularly limited, either, and can be, for instance, 5 μm to 30 μm. The positive electrode active material layer may comprise, in addition to a positive electrode active material, additives such as a conductive material, binder, etc., as necessary As the positive electrode active material, various materials known to be usable as positive electrode active materials in lithium secondary batteries can be used without particular limitations. For instance, can be used a lithium transition metal compound comprising lithium (Li) and at least one species of transition metal as metal constituents, and the like. For example, can be used a spinel or layered lithium transition metal composite oxide, a polyanion-type (e.g. olivine-type) lithium transition metal compound, and the like. More specifically, for instance, the following compounds can be used.

(1) Examples of a spinel lithium transition metal composite oxide include a spinel lithium manganese composite oxide comprising at least manganese (Mn) as a transition metal. More specifically, a spinel lithium manganese composite oxide represented by a general formula $Li_pMn_{2-q}M_qO_{4+\alpha}$ is cited. Herein, p meets $0.9 \leq p \leq 1.2$; q meets $0 \leq q < 2$, typically $0 \leq q \leq 1$; and α a value satisfying $-0.2 \leq \alpha \leq 0.2$ while keeping a net neutral charge. When q is greater than 0 (0<q), M may be one, two or more species selected from optional metals excluding Mn or non-metals.

(2) The layered lithium transition metal composite oxide includes a compound represented by a general formula $LiMO_2$. Herein, M comprises at least one species of transition metal such as Ni, Co, Mn, etc., and may further comprise other metal(s) or non-metal(s). Examples of the composite oxide include a so-called single-transition-metal-type lithium transition metal composite oxide comprising a single species among the transition metals, a so-called two-transition-metal-type lithium transition metal composite oxide comprising two species among the transition metals, and a three-transition-metal-type lithium transition metal composite oxide comprising Ni, Co and Mn as transition metals. In particular, a three-transition-metal-type lithium transition metal composite oxide is preferable. An example of the three-transition-metal-type lithium transition metal composite oxide can be represented by a general formula Li(Li$_a$Mn$_x$Co$_y$Ni$_z$)O$_2$ (in the formula, a, x, y and z are real numbers that satisfy a+x+y+z=1).

(3) As the positive electrode active material, can be also used a lithium transition metal composite oxide represented by a general formula Li$_2$MO$_3$. Herein, M comprises at least one species of transition metal such as Mn, Fe, Co, etc., and may further comprise other metal(s) or non-metal(s). Specific examples include Li$_2$MnO$_3$, Li$_2$PtO$_3$ and the like.

(4) A lithium transition metal compound (phosphate) represented by a general formula LiMPO$_4$ can be further cited. Herein, M comprises at least one species of transition metal such as Mn, Fe, Ni, Co, etc., and may further comprise other metal(s) or non-metal(s). Specific examples include LiMnPO$_4$, LiFePO$_4$ and the like.

(5) As the positive electrode active material, can be also used a lithium transition metal compound (phosphate) represented by a general formula Li$_2$MPO$_4$F. Herein, M comprises at least one species of transition metal such as Mn, Ni, Co, etc., and may further comprise other metal(s) or non-metal(s). Specific examples include Li$_2$MnPO$_4$F and the like.

(6) A solid solution of LiMO$_2$ and Li$_2$MO$_3$ can be also used as the positive electrode active material. Herein, LiMO$_2$ refers to a composition represented by the general formula shown in (2) above Li$_2$MO$_3$ refers to a composition represented by the general formula shown in (3) above. A specific example is a solid solution represented by 0.5LiNiMnCoO$_2$—0.5Li$_2$MnO$_3$.

The positive electrode active materials listed above can be used singly as one species or in combination of two or more species. Among them, the positive electrode active material is preferably a three-transition-metal-type lithium transition metal composite oxide.

The positive electrode active material may further comprise one, two or more species of metal among Na, Mg, Ca, Sr, Ti, Zr, V, Nb, Cr, Mo, Fe, Rh, Pd, Pt, Cu, Zn, B, Al, Ga, In, Sn, La, W and Ce. While the amount of these metals added (their content) is not particularly limited, it is suitably 0.01% by mass to 5% by mass (e.g. 0.05% by mass to 2% by mass, typically 0.1% by mass to 0.8% by mass).

In the art disclosed herein, of the transition metal(s) contained in the positive electrode active material, Mn preferably accounts for 10% or more (e.g. 20% or more) by the number of atoms. A positive electrode active material having such a composition is preferable from the standpoint of costs and supply risks of raw materials, as it mainly uses Mn which is an abundant, inexpensive metal. A positive electrode using a positive electrode active material comprising Mn (e.g. a spinel lithium manganese composite oxide) tends to be susceptible to Mn dissolution from the positive electrode during charging and discharging at a high voltage. Accordingly, being applied to a secondary battery constructed with the positive electrode, the present invention can preferably bring about inhibition of capacity reduction caused by the dissolved transition metal (Mn).

The art disclosed herein can also be preferably applied to a secondary battery using, as the positive electrode active material, a material having an operating voltage (vs. Li/Li+) (a voltage relative to lithium metal may be expressed with "vs. Li/Li+" hereinafter) higher than that of a general lithium secondary battery (about 4.1 V upper voltage limit) at least in a partial range between 0% SOC and 100% SOC. In this embodiment, for example, can be preferably used a positive electrode active material having an upper limit of operating voltage (upper operating voltage limit) of 4.2 V (vs. Li/Li+) or higher. In other words, a positive electrode active material whose maximum operating voltage is 4.2 V (vs. Li/Li+) or higher in the range from 0% SOC to 100% SOC can be preferably used. The use of such a positive electrode active material can bring about a lithium secondary battery whose positive electrode operates at a voltage of 4.2 V (vs. Li/Li+) or higher. The positive electrode active material may have an upper operating voltage limit (vs. Li/Li+) of preferably 4.3 V or higher (e.g. 4.35 V or higher, even 4.4 V or higher). While the upper limit of the operating voltage (vs. Li/Li+) is not particularly limited, it can be 5.5 V or lower (e.g. 5.3 V or lower, typically 5.1 V or lower).

Herein, the operating voltage of a positive electrode active material can be determined as follows. In particular, a three-electrode cell is constructed, using a positive electrode comprising a positive electrode active material to be measured as a working electrode (WE), along with a lithium metal piece as a counter electrode (CE), another lithium metal piece as a reference electrode (RE), and an electrolyte solution containing approximately 1 mol/L of LiPF6 in a mixed solvent at ethylene carbonate/dimethyl carbonate = 30/70 (by volume). Based on the theoretical capacity of the cell, the SOC value of the cell is changed by a 5% increment from 0% SOC to 100% SOC. The SOC can be adjusted, for instance, by applying a constant-current charge across WE and CE with a general charging/discharging device or a potentiostat. The cell adjusted to each SOC value is left standing for one hour and then subjected to a measurement of voltage across WE and RE. The voltage can be recorded as the operating voltage (vs. Li/Li+) of the positive electrode active material at that particular SOC value. In general, the operating voltage of a positive electrode active material is maximized over a SOC range that includes 100% SOC. Thus, the upper operating voltage limit of the positive electrode active material (e.g., whether or not it is at least 4.2 V) can be usually assessed based on the operating voltage of the positive electrode active material at 100% SOC (i.e., when fully charged).

As the conductive material, a conductive powdery material such as carbon powder and carbon fiber are preferably used. Preferable examples of carbon powder include various kinds of carbon black, such as acetylene black, furnace black, Ketjen black, graphite powder and the like. Alternatively, among conductive fiber species such as carbon fiber, metal fiber, etc., and powdered metals such as copper, nickel, etc., and organic conductive materials such as polyphenylene derivatives, etc., and the like, solely one species or a mixture of two or more species can be used.

Examples of the binder include various polymer materials. For instance, when the positive electrode active material layer is formed with an aqueous composition (a composition wherein water or a mixed solvent primarily comprising water is used as the dispersion medium for active material particles), a water-soluble or water dispersible polymer material can be preferably used as a binder. Examples of water-soluble or water-dispersible polymer materials include cellulose-based polymers such as carboxymethyl cellulose (CMC), etc.; polyvinyl alcohol (PVA); fluorine-based resins such as polytetrafluoroethylene (PTFE), etc.; vinyl acetate based polymers; rubbers such as styrene-butadiene rubber (SBR), acrylic acid-modified SBR resins (SBR-based latexes), etc.; and the like. Alternatively, when the positive electrode active material layer is formed with a solvent-based composition (a composition whose dispersion medium for active material particles primarily comprises an organic solvent), can be used polymer materials including vinyl halide resins such as polyvinylidene fluoride (PVdF), polyvinylidene chloride (PVdC), etc.; polyalkylene oxides such as polyethylene oxide (PEO), etc.; and the like. These binders can be used singly as one species or in combination of two or more species. The polymer materials exemplified above may be used also as thickeners or other additives in the positive electrode active material layer forming composition, besides being used as the binder.

The positive electrode active material content in the positive electrode active material layer is preferably higher than about 50% by mass, or preferably about 70 to 97% by mass (e.g. 75% to 95% by mass). The additive content in the positive electrode active material layer is not particularly limited. The conductive material content is preferably about 1 part by mass to 20 parts by mass (e.g. 2 parts by mass to 10 parts by mass, typically 3 parts by mass to 7 parts by mass) relative to 100 parts of positive electrode active material. The binder content is preferably about 0.8 part by mass to 10 parts by mass (e.g. 1 part by mass to 7 parts by mass, typically 2 parts by mass to 5 parts by mass) relative to 100 part by mass of positive electrode active material.

The method for fabricating a positive electrode as described above is not particularly limited and a conventional method can be suitably used. For instance, it can be fabricated by the following method. First, a positive electrode active material, as well as a conductive material, binder and the like used as necessary, is mixed with a suitable solvent (an aqueous solvent, organic solvent or a mixed solvent of these) to prepare a paste-like or slurry positive electrode active material layer-forming composition. The mixing can be carried out, for instance, using a suitable mixer (a planetary mixer, etc.). The aqueous solvent used to prepare the composition should preferably just be aqueous as a whole and water or a solvent mixture primarily comprising water can be preferably used. Preferable examples of the organic solvent include N-methyl-2-pyrrolidone (NMP), methyl ethyl ketone, toluene, etc.

The composition thus prepared is applied to a positive current collector sheet and then pressed after the solvent is allowed to evaporate off by drying. As a method for applying the composition to the positive current collector sheet, can be suitably employed a technique similar to conventionally-known methods. For example, with a suitable applicator such as die coater and the like, the composition can be preferably applied to the positive current collector sheet. The solvent can be dried off well by employing any one or a combination of natural drying, heated air drying, vacuum drying, and so on. As a pressing method, can be employed a compression method such as a conventionally-known roll-pressing method, etc. A positive electrode can be thus obtained having a positive electrode active material layer formed on the positive current collector sheet.

The coating weight of positive electrode active material layer (non-volatile-based coating amount of positive electrode active material layer-forming composition) per unit surface area of positive current collector sheet is not particularly limited. From the standpoint of obtaining sufficient conductive paths (conducing paths), it is preferably 3 mg/cm$^2$ or greater (e.g. 5 mg/cm$^2$ or greater, typically 6 mg/cm$^2$ or greater), but 45 mg/cm$^2$ or less (e.g. 28 mg/cm$^2$ or less, typically 18 mg/cm$^2$ or less) per face of positive current collector sheet. The positive electrode active material layer preferably has a thickness per face of positive current collector sheet of 30 μm or larger (e.g. 50 μm or larger, typically 70 μm or larger), but 120 μm or smaller (e.g. 100 μm or smaller, typically 80 μm or smaller).

As the negative current collector sheet constituting the negative electrode (e.g. a negative electrode sheet), can be preferably used a conductive member formed of a metal having a good conductivity. For example, can be used copper or an alloy comprising copper as the primary component. The shape of negative current collector sheet is not particularly limited as it may vary in accordance with the shape of the battery, etc. It may be in various forms including shapes of a rod, plate, sheet, foil, mesh, and so on. The thickness of negative current collector sheet is not particularly limited, either. It can be about 5 μm to 30 μm.

Similarly to heretofore known negative electrode active material layers, the negative electrode active material layer comprises a negative electrode active material capable of storing and releasing lithium ions serving as charge carriers. The composition or form of the negative electrode active material is not particularly limited. Among materials conventionally used in lithium secondary batteries, one, two or more species can be used. Examples of such negative electrode active materials include carbon materials generally used in lithium secondary batteries. Typical examples of such carbon materials include graphite carbons (graphite), amorphous carbons and the like. It is preferable to use a granular carbon material (carbon particles) containing a graphite structure (layered structure) at least partially. In particular, the use of a carbon material primarily comprising natural graphite is preferable. The natural graphite may be obtained by spheroidizing graphite flakes. Alternatively, a carbonaceous powder obtained by coating graphite surfaces with an amorphous carbon can be used.

As other negative electrode active materials, oxides such as lithium titanate, etc.; silicon materials, tin materials and so on can be used as a single substance, as an alloy, as a compound formed therefrom or as a composite material combining these materials. In particular, it is especially preferable to use a negative electrode active material having a reduction potential (vs. Li/Li+) of about 0.5 V or lower (e.g. 0.2 V or lower, typically 0.1 V or lower). The use of a negative electrode active material having such a reduction potential can bring about a high energy density. Examples of a material exhibiting such a low potential include a graphitic carbon material (typically graphite particles).

The negative electrode active material content in the negative electrode active material layer is preferably greater than about 50% by mass and preferably about 90 to 99% by mass (e.g. 95 to 99% by mass, typically 97 to 99% by mass). When the negative electrode active material layer comprises the negative electrode active material as particles (e.g. carbon particles), the particles have an average particle diameter of for instance, preferably 5 μm to 100 μm or more preferably 5 μm to 50 μm. In particular, a preferable negative electrode active material is in a form of particles having an average particle diameter of 5 μm to 30 μm (more preferably 5 μm to 15 μm, e.g. 8 μm to 12 μm).

In addition to the negative electrode active material, the negative electrode active material layer can further comprise, as necessary, one, two or more species of binder, thickener or other additives that can be added to negative electrode active material layers in general lithium secondary batteries. The binder can be various heretofore known polymeric materials. The additive content in the negative electrode active material layer is not particularly limited. It is usually preferably about 0.5 to 10 parts by mass (e.g.

about 0.8 to 5 parts by mass, typically 1 to 3 parts by mass) relative to 100 parts by mass of negative electrode active material.

In an embodiment of the art disclosed herein, the negative electrode active material layer may comprise a hot-melt binder in place of the binder or in addition to the binder. In this description, the term "hot-melt binder" refers to a binder that is present as a solid at ambient temperature and has characteristics such that it melts when heated to a prescribed temperature. For instance, it is preferable to use a binder that has characteristics such that it is in a solid state at ambient temperature (20 to 30° C.), but melts when heated to a certain temperature.

Having certain hot-melt characteristics, the hot-melt binder is thought to be arranged to hinder reactions of Li ions at an end face and the surface layer of the negative electrode active material layer. For instance, it is thought to be arranged to coat the negative electrode active material in the non-face-to-face region $N_{NF}$. The hot-melt binder is nonconductive and is thought to inhibit the permeation of Li ions. Thus, at a high temperature, it presumably works to prevent Li ions at the negative electrode (typically the negative electrode's surface layer) from reacting with the component dissolved out from the positive electrode to turn into irreversible capacity.

The melting point of the hot-melt binder is thought to be preferably in the temperature range used during formation of the negative electrode active material layer (typically in the temperature range used in the drying process). Because of this, it may melt, for instance, when forming the negative electrode active material layer (typically in the drying process) and may be arranged to coat the negative electrode active material in the non-face-to-face region(s) $N_{NF}$. In a preferable embodiment disclosed herein, the hot-melt binder has a melting point of 40° C. or above (e.g. 50° C. or above, typically 55° C. or above). In another preferable embodiment, it may be 60° C. or above (e.g. 65° C. or above, typically 70° C. or above). The melting point is preferably 120° C. or below (e.g. 100° C. or below, typically 90° C. or below). The method for measuring the melting point is not particularly limited. The melting point can be measured based on a heretofore known measurement method. For instance, as the melting point, can be used its melting peak temperature obtainable when heated at a heating rate of 10° C./min, using a DSC (differential scanning calorimetry) apparatus.

The hot-melt binder preferably has an average particle diameter smaller than 0.3 µm (e.g. smaller than 0.1 µm, typically smaller than 0.08 µm). A hot-melt binder of such a small diameter may tend to coat the negative electrode active material thinly and evenly. It may also have a greater tendency to inhibit the permeation of Li ions. Accordingly, it is expected to sufficiently prevent the component dissolved out from the positive electrode and Li ions on the negative electrode surface from undergoing a reaction to yield irreversible capacity, and to more preferably inhibit capacity degradation during high-temperature storage. While the lower limit of average particle diameter of hot-melt binder is not particularly limited, it is suitably about 0.01 µm or larger. The average particle diameter of hot-melt binder is measured by a Coulter counter method. The Coulter counter method detects the electric resistance of sample particles passing through fine pores. For instance, it can be measured with trade name "MULTISIZER 3" available from Beckman Coulter, Inc. or a similar system.

The hot-melt binder preferably has a density of 1.2 g/cm³ or smaller (e.g. 1.1 g/cm³ or smaller, typically 0.5 g/cm³ to 1.0 g/cm³). The density of hot-melt binder can be determined based on JIS K6760 when the hot-melt binder is formed of a polyolefin-based resin. When it is formed of any other material, the density can be measured based on JIS K6760 or by suitably employing a heretofore known density measurement method.

As the hot-melt binder having the characteristics described above, a synthetic resin (typically a thermoplastic resin) is preferably used. The synthetic resin is not particularly limited Examples include polyolefins such as a polyethylene (PE), ethylene-vinyl acetate copolymer (EVA), ethylene-unsaturated carboxylic acid copolymer (e.g. ethylene-methacrylic acid copolymer (EMAA), ethylene-acrylic acid copolymer (EAA)), etc.; acrylic polymers (copolymers) such as polymethyl (meth)acrylate, etc.; and the like. Among them, an ethylene-unsaturated carboxylic acid polymer is preferable and an EMAA is particularly preferable.

The hot-melt binder disclosed herein is preferably an ionomer resin The ionomer resin can be defined as a polymer that is formed of a main polymer chain primarily constituted with a hydrocarbon and has side chain carboxyl groups or side chain sulfonate groups which are at least partially neutralized with a metal ion, organic amine, ammonia or the like. Such an ionomer resin may be an aggregate (ionic cluster) formed of a polymer aggregated (clustered) due to the activity of the metal ion, etc. Specific examples of the ionomer resin include an ethylene-unsaturated carboxylic acid copolymer having side chain carboxyl groups which are at least partially neutralized with a metal cation.

The structure of the ethylene-unsaturated carboxylic acid copolymer is not particularly limited. It may be a random copolymer or a graft copolymer. Examples of the graft copolymer include a copolymer in which PE is graft polymerized with an unsaturated carboxylic acid.

As the unsaturated carboxylic acid, an unsaturated carboxylic acid having 3 to 8 carbon atoms is preferably used. Specific examples of the unsaturated carboxylic acid having 3 to 8 carbon atoms include acrylic acid, methacrylic acid, maleic acid, fumaric acid, itaconic acid, crotonic acid, isocrotonic acid, citraconic acid and the like. These can be used singly as one species or in combination of two or more species. In particular, acrylic acid and methacrylic acid are preferable.

The ethylene-unsaturated carboxylic acid copolymer may comprise, in addition to the ethylene and unsaturated carboxylic acid, a third component copolymerizable with the ethylene or unsaturated carboxylic acid. Examples of the third component include unsaturated carboxylic acid esters (typically acrylic acid esters) such as methyl (meth)acrylate, ethyl (meth)acrylate, butyl (meth)acrylate, etc.; vinyl esters such as vinyl acetate, etc.; and the like.

The ethylene and unsaturated carboxylic acid in the ethylene-unsaturated carboxylic acid copolymer preferably has an ethylene to unsaturated carboxylic acid mass ratio in a range of 60:40 to 99:1. The mass ratio (ethylene:unsaturated carboxylic acid) is preferably 60:40 to 98:2 (e.g. 70:30 to 95:5, typically 75:25 to 92:8). When the ethylene-unsaturated carboxylic acid copolymer comprises a third component, the third component content is preferably 40% by mass or lower (e.g. 10% by mass or lower, typically 5% by mass or lower). The copolymer may be essentially free of a third component. In other words, the ethylene-unsaturated carboxylic acid copolymer may be formed of an ethylene and an unsaturated carboxylic acid.

In the ionomer resin, the carboxyl groups and/or sulfonate groups present as side chains in the polymer are at least partially neutralized with a monovalent to trivalent metal cation, organic amine, ammonia, etc. Examples of the metal cation include monovalent metal ions such as sodium ion ($Na^+$), potassium ion ($K^+$), lithium ion ($Li^+$), etc.; divalent metal ions such as magnesium ion ($Mg^{2+}$), zinc ion ($Zn^{2+}$), calcium ion ($Ca^{2+}$), copper ion ($Cu^{2+}$), iron ion ($Fe^{2+}$), barium ion ($Ba^{2+}$), etc.; and trivalent metal ions such as aluminum ion ($Al^{3+}$). In particular, $Na^+$ and $Zn^{2+}$ are preferable.

Specific examples of a hot-melt binder having the characteristics described above include ionomer resin particles of ethylene-methacrylic acid copolymer available from Mitsui Chemicals, Inc., trade name "CHEMIPEARL S650." This product has a minimum film formation temperature of 55° C. and stable film formation is possible at a temperature of 80° C. Thus, the melting point is presumably 55° C. or above, but 80° C. or below, or in a certain range (e.g. 80° C. ±20° C., typically 80° C.±10° C.) including 80° C. at which stable film formation is possible.

The hot-melt binder content in the negative electrode active material layer is not particularly limited. It is preferably about 0.1 to 5 parts by mass (e.g. 0.2 to 3 parts by mass, typically 0.3 to 1 part by mass) relative to 100 parts by mass of negative electrode active material. The hot-melt binder usage in this range preferably brings about excellent high-temperature characteristics. It can also preferably bring about inhibition of battery resistance elevation and excellent low-temperature characteristics.

The negative electrode sheet can be fabricated more or less in the same manner as fabricating the positive electrode sheet, except for making the high density part $N_{HD}$. For instance, a negative electrode active material as well as a conductive material, binder and so on used as necessary is mixed with a suitable solvent (aqueous solvent, organic solvent or a mixture of these) to prepare a paste-like or slurry negative electrode active material layer-forming composition. As the solvent, those used in fabricating the positive electrode can be preferably used.

The composition thus prepared is applied to a negative current collector sheet and the solvent is allowed to evaporate off by drying. If necessary, the dried negative electrode sheet is entirely compressed (pressed) to adjust the density of the whole negative electrode active material layer that includes the face-to-face region $N_F$. Subsequently, the negative electrode active material layer can be locally compressed to form a high density part $N_{HD}$. The adjustment of the density of the whole negative electrode active material layer and local compression can be carried out at the same time (e.g. by a single pressing operation). Methods for locally compressing the negative electrode active material layer include a method using a pressing device (roll, plate, etc.) that has a protruding portion corresponding to the local part. Other methods for forming the high density part $N_{HD}$ include a method where the composition is applied thicker to the place forming the high density part $N_{HD}$ than the other place (e.g. the face-to-face region $N_F$), dried, and pressed to approximately even out the thickness of the whole negative electrode active material layer. Methods for applying the composition thicker to the place forming the high density part $N_{HD}$ than the other place include a method using a coater having a discharge opening that has a corresponding shape, a method where the composition is additionally applied (e.g. applied as an additional layer) to the place forming the high density part $N_{HD}$, and the like.

In a preferable embodiment of the art disclosed herein, the negative electrode active material layer has an essentially uniform composition throughout the entire surface area. In other words, the face-to-face region $N_F$ and the non-face-to-face region $N_{NF}$ have essentially the same composition. The high density part $N_{HD}$ and the other part also have essentially the same composition. Such a negative electrode active material layer can be fabricated with just one kind of composition as the negative electrode active material layer-forming composition, and thus is advantageous from the standpoint of the ease of production management and productivity, etc. The art disclosed herein can be preferably implemented, for instance, in an embodiment where the high density part $N_{HD}$ and the other part in the negative electrode active material layer differ from each other only in the presence (history) of compression. The presence of compression can be detected as different densities and porosities between the high density part $N_{HD}$ and the other part.

The coating weight of negative electrode active material layer (non-volatile-based coating amount of negative electrode active material layer-forming composition) per unit surface area on the negative current collector sheet is not particularly limited. From the standpoint of obtaining sufficient conductive paths (conducing paths), it is preferably 2 $mg/cm^2$ or greater (e.g. 3 $mg/cm^2$ or greater, typically 4 $mg/cm^2$ or greater), but 40 $mg/cm^2$ or less (e.g. 22 $mg/cm^2$ or less, typically 16 $mg/cm^2$ or less) per face of negative current collector sheet. The negative electrode active material layer preferably has a thickness per face of negative current collector of 20 μm or larger (e.g. 40 μm or larger, typically 60 μm or larger), but 100 μm or smaller (e.g. 80 μm or smaller, typically 70 μm or smaller).

The separator (separator sheet) placed to separate the positive electrode and negative electrode can be a material that insulates the positive electrode active material layer and negative electrode active material layer while allowing the transport of lithium ions. A preferable example of separator is constituted with a porous polyolefin-based resin. For instance, can be preferably used an about 5 μm to 30 μm thick porous separator sheet formed of a synthetic resin (e.g. polyethylene (PE), polypropylene (PP), or a polyolefin having a constitution combining two or more layers of these). The separator sheet may be also provided with a heat-resistant layer such as an inorganic porous layer, etc. When the liquid electrolyte is substituted with a solid (gel) electrolyte formed by adding a polymer to the electrolyte, the electrolyte itself may serve as a separator and another separator may not be required.

The non-aqueous electrolyte injected into the lithium secondary battery may comprise at least a non-aqueous solvent and a supporting salt. A typical example is an electrolyte solution having a composition comprising a supporting salt in a suitable non-aqueous solvent. Examples of the non-aqueous solvent include ethylene carbonate (EC), propylene carbonate (PC), diethyl carbonate (DEC), dimethyl carbonate (DMC), ethyl methyl carbonate (EMC), 1,2-dimethoxyethane, 1,2-diethoxyethane, tetrahydrofuran, 2-methyltetrahydrofuran, dioxane, 1,3-dioxolane, diethylene glycol dimethyl ether, ethylene glycol dimethyl ether, acetonitrile, propionitrile, nitromethane, N,N-dimethylformamide, dimethylsulfoxide, sulfolane, γ-butyrolactone, etc. Fluorinated carbonates such as monofluoroethylene carbonate (MFEC) and difluoroethylene carbonate (DFEC) can be preferably used as well. These can be used solely as one species or as a mixture of two or more species. In particular, a solvent mixture of EC, DMC and EMC is preferable.

As the supporting salt, for example, can be used one, two or more species of lithium compounds (lithium salts) such as $LiPF_6$, $LiPF_4$, $LiClO_4$, $LiAsF_6$, $LiCF_3SO_3$, $LiC_4F_9SO_3$, $LiN(CF_3SO_2)_2$, $LiC(CF_3SO_2)_3$, $LiI$ and the like. The supporting salt concentration is not particularly limited while it can be about 0.1 mol/L to 5 mol/L (e.g. 0.5 mol/L to 3 mol/L, typically 0.8 mol/L to 1.5 mol/L).

The non-aqueous electrolyte may comprise optional additives as necessary to an extent not significantly impairing the objectives of the present invention. The additive may be used so as to increase the battery's output performance, to increase the shelf life (to inhibit a capacity decrease during storage, etc.), to bring about greater cycle characteristics, to increase the initial charging and discharging efficiencies, and so on. Examples of preferable additives include a fluorophosphate (preferably a difluorophosphate, e.g. lithium difluorophosphate represented by $LiPO_2F_2$) and lithium bis(oxalato)borate (LiBOB). Alternatively, for instance, can be used additives such as cyclohexylbenzene, biphenyl and the like which are applicable in dealing with overcharges.

The art disclosed herein can be preferably applied to a relatively high capacity lithium secondary battery having a battery capacity of 20 Ah or higher. Examples include a lithium secondary battery having a battery capacity of 20 Ah or higher (e.g. 22 Ah or higher) up to 100 Ah. In such a high capacity-type lithium secondary battery, a large surface area of the negative electrode active material layer does not face the positive electrode active material layer, and thus, more Li ions are likely to be irreversibly fixed. By applying the constitution of the present invention to such a large-capacity battery, while increasing or retaining battery properties such as cycle characteristics, etc., capacity degradation can be preferably inhibited during high-temperature storage.

Figure 8:
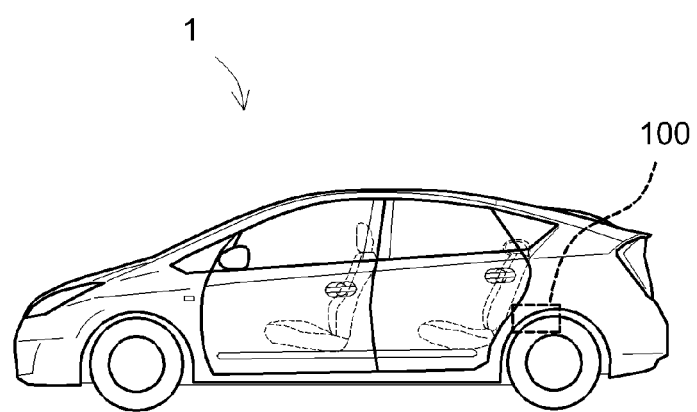
FIG. 8 shows a schematic side view of a vehicle (automobile) comprising the non-aqueous electrolyte secondary battery according to an embodiment.

As described above, for the lithium secondary battery in the art disclosed herein, capacity degradation during high-temperature storage is inhibited. Accordingly, it can be used as a secondary battery for various purposes. For example, as shown in FIG. 8, a lithium secondary battery 100 can be installed in a vehicle 1 such as an automobile, etc., and preferably used as a power supply for a drive source such as a motor and the like to drive the vehicle 1. Accordingly, the present invention can provide a vehicle (typically an automobile, particularly an automobile comprising an electric motor such as a hybrid vehicle (HV), plug-in hybrid vehicle (PHV), electric vehicle (EV) and fuel cell vehicle) 1 comprising, as its power source, the lithium secondary battery (typically a battery system comprising several series-connected batteries) 100.

Several worked examples relating to the present invention are described below, but the present invention is not intended to be limited to these examples. In the description below, "parts" and "%" are by mass unless otherwise specified.

EXAMPLE 1

[Fabrication of Positive Electrode Sheet]

With NMP, were mixed a powdered lithium nickel manganese cobalt oxide ($Li[Ni_{1/3}Mn_{1/3}Co_{1/3}]O_2$) as a positive electrode active material, acetylene black as a conductive material and PVdF as a binder at a mass ratio of these materials of 100:5:3 to prepare a positive electrode active material layer-forming dispersion composition (Composition p1). The composition p1 was evenly applied to each face of a long sheet of 15 μm thick aluminum foil (positive current collector sheet). A compound p1-free region was provided on each face of one edge along the length direction of the positive current collector sheet. The composition p1 was dried (blow-dried with hot air) at a temperature of 120° C. for 20 seconds and cut to fabricate a positive electrode (positive electrode sheet) comprising the positive current collector sheet and a positive electrode active material layer formed on each face thereof. The positive electrode sheet was 4500 mm long and 170 μm thick in total, with the positive electrode active material layer being 94 mm in width, 2.1 g/cm³ in density and 43% in porosity (by volume). The cut was made so that the positive current collector sheet was left with the positive electrode active material layer-free portion on the one edge (on the terminal-connected edge) along the length direction, but was otherwise entirely covered on each face with the positive electrode active material layer up to the other edge along the length direction.

[Fabrication of Negative Electrode Sheet]

With ion-exchanged water, were mixed powdered graphite (12 μm average particle diameter) as a negative electrode active material, CMC as a thickener and a hot-melt binder (trade name "CHEMIPEARL S650" available from Mitsui Chemicals, Inc., ionomer resin particles of ethylene-methacrylic acid copolymer) at a mass ratio of these materials of 100:1:1 to prepare a negative electrode active material layer-forming dispersion (composition n1). The composition n1 was evenly applied to each face of 14 μm thick copper foil (negative current collector sheet). A compound n1-free region was provided on each face of one edge along the length direction of the negative current collector sheet. The composition n1 was dried (blow-dried with hot air) at a temperature of 70° C. for 180 seconds and cut to fabricate a negative electrode (negative electrode sheet) comprising the negative current collector sheet and a negative electrode active material layer formed on each face thereof. The negative electrode sheet was 4700 mm long and 150 μm thick in total, with the negative electrode active material layer being 100 mm in width, 1.29 g/cm³ in density and 41% in porosity (by volume). The cut was made so that the negative current collector sheet was left with the negative electrode active material layer-free portion on the one edge along the length direction, but was otherwise entirely covered on each face with the negative electrode active material layer up to the other edge along the length direction.

[Fabrication of Lithium Secondary Battery]

The resulting positive electrode sheet and negative electrode sheet along with separators in-between were elliptically wound. As the separator, was used a long sheet of three-layer porous film (20 μm thick) formed of PP/PE/PP. The positive electrode sheet and the negative electrode sheet were arranged so that the extra portions ($N_{E1}$ in FIG. 6) on the negative electrode active material layer-free edge was 3.5 mm wide and the other extra portions ($N_{E2}$ in FIG. 6) on the opposite side was 2.5 mm wide. The elliptically wound electrode body was placed between two flat plates at ambient temperature and 4 kN/cm² pressure was applied in the minor axis direction of the ellipse for two minutes to flatten the electrode body. To the edges of positive and negative current collector sheets in the wound electrode body, electrode terminals were connected, respectively. The resultant was placed in an aluminum battery case. Subsequently, a non-aqueous electrolyte solution was injected and the opening was sealed to fabricate a square lithium secondary battery having a rated capacity of 24.0 Ah. As the non-aqueous electrolyte solution, was used an electrolyte solution containing about 1 mol/L of $LiPF_6$ as a supporting salt dissolved in a mixed solvent of EC, DMC and EMC at 3:4:3 (volume ratio). 125 g of the non-aqueous electrolyte solution was injected.

EXAMPLE 2

The extra portions opposite from the negative electrode active material layer-free edge were made 1.0 mm in width.

EXAMPLE 3

Otherwise, in the same manner as Example 1, a negative electrode sheet was fabricated. Using the negative electrode sheet, a lithium secondary battery was fabricated in the same manner as Example 1.

EXAMPLE 3

Figure 7:
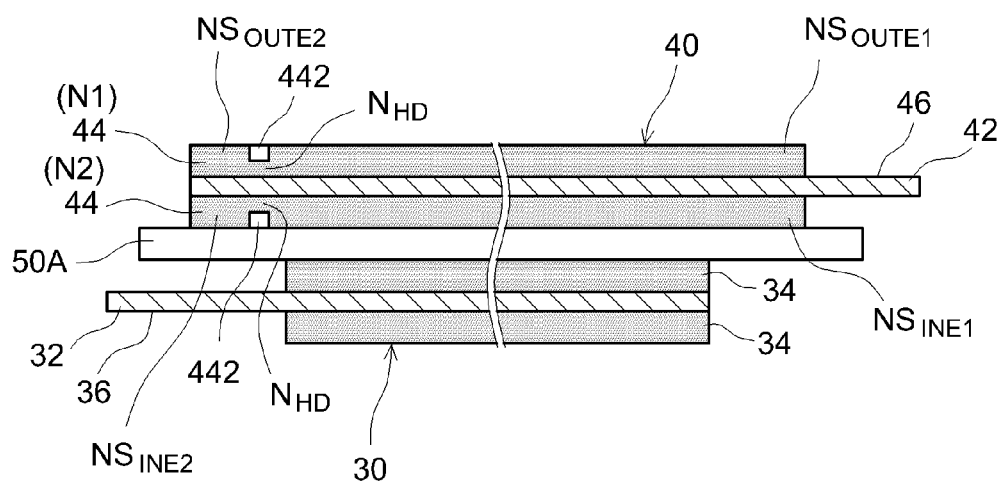
FIG. 7 shows an enlarged cross-sectional view illustrating the main part of the negative electrode sheet according to Example 3.

With respect to the negative electrode sheet obtained in Example 1, the negative electrode active material layers were locally compressed to form high density parts $N_{HD}$. In particular, over areas extending from the outer circumference end of the negative electrode sheet over a length corresponding to the length of the outermost circumference of the wound electrode body, the extra portions of the negative electrode active material layer opposite from the negative electrode active material layer-free edge were compressed over 0.5 mm widths from both surfaces along the centers of widths of the extra portions. In particular, as shown in FIG. 7, with respect to the negative electrode active material layers N1 and N2 provided on the outer surface S1 and inner surface S2 of the negative current collector sheet 42 in the outermost circumference of the negative electrode sheet 40, in each of the extra portions $NS_{OUTE2}$ and $NS_{INE2}$ opposite from the negative electrode active material layer-free edge, a single compression groove 442 was formed, extending in parallel with the edge of the negative current collector sheet, with the two compression grooves 442 on the two faces being in inner-outer symmetry. High density parts $N_{HD}$ were thus formed at the bottoms of the compression grooves 442. The high density parts $N_{HD}$ had a density $\rho N_{HD}$ of 1.96 g/cm$^3$. The density of high density part $N_{HD}$ was determined based on the coating weight of the negative electrode active material layer-forming composition and the thicknesses of high density parts $N_{HD}$. Using the negative electrode sheet having the high density parts $N_{HD}$ thus formed, a lithium secondary battery was fabricated in the same manner as Example 1.

Of the negative electrode active material layers N1 and N2, the parts (including the face-to-face regions $N_F$) other than the high density parts $N_{HD}$ had the density of 1.29 g/cm$^3$ as described above. Accordingly, in the negative electrode sheet according to this example, $\rho N_{HD}/\rho N_F$ is determined to be 1.96/1.29=1.51. In the widths of the extra portions $NS_{OUTE2}$ and $NS_{INE2}$, the ratios of the widths of the high density parts $N_{HD}$ are both determined to be 0.5/2.5=0.2 (20%). These ratios match the surface area ratios of the high density parts $N_{HD}$ in the extra portions $NS_{OUTE2}$ and $NS_{INE2}$.

EXAMPLE 4

The compression condition was modified so that the density $\rho N_{HD}$ of high density parts $N_{HD}$ was 2.01 g/cm$^3$. Otherwise in the same manner as Example 3, was formed a single line of high density part $N_{HD}$ (compression groove) per face in the extra portions of the negative electrode sheet obtained in Example 1. Using this negative electrode sheet, a lithium secondary battery was fabricated in the same manner as Example 1.

EXAMPLE 5

The compression condition was modified so that the density $\rho N_{HD}$ of the high density part $N_{HD}$ was 2.10 g/cm$^3$. Otherwise in the same manner as Example 3, was formed a single line of high density part $N_{HD}$ (compression groove) per face in the same extra portion of the negative electrode active material layer. While forming the compression grooves, the negative current collector sheet partially was damaged. Thus, no lithium secondary battery was made.

EXAMPLE 6

As shown in FIG. 4 and FIG. 5, in the extra portions of the negative electrode sheet obtained in Example 1, from the outer circumference end of the negative electrode sheet over a length corresponding to the length of the outermost circumference of the wound electrode body, two 0.5 mm wide lines of high density part $N_{HD}$ (compression grooves 442) were formed per face, extending in parallel with the center of width of the extra portion $NS_{OUTE2}$ or $NS_{INE2}$, separated by the same distance. The high density parts $N_{HD}$ had a density $\rho N_{HD}$ of 1.96 g/cm$^3$. Using this negative electrode sheet, a lithium secondary battery was fabricated in the same manner as Example 1.

EXAMPLE 7

In the extra portions of the negative electrode sheet obtained in Example 1, from the outer circumference end of the negative electrode sheet over the length corresponding to the length of the outermost circumference of the wound electrode body, three 0.5 mm wide lines of high density part $N_{HD}$ (compression grooves) were formed per face, extending in parallel with the center of width of the extra portion, separated by the same distance. The high density parts $N_{HD}$ had a density $\rho N_{HD}$ of 1.96 g/cm$^3$. Using this negative electrode sheet, a lithium secondary battery was fabricated in the same manner as Example 1.

EXAMPLE 8

The extra portions were made 1.0 mm in width and the two lines of high density part $N_{HD}$ (compression grooves) per face were made both 0.3 mm in width. Otherwise in the same manner as Example 6, a negative electrode sheet was fabricated. Using this negative electrode sheet, a lithium secondary battery was fabricated in the same manner as Example 1.

EXAMPLE 9

The two lines of high density part $N_{HD}$ (compression grooves) per face were made both 0.3 mm in width. Otherwise in the same manner as Example 6, a negative electrode sheet was fabricated. Using this negative electrode sheet, a lithium secondary battery was fabricated in the same manner as Example 1.

10>

The extra portions were made 4.0 mm in width and two lines of high density part $N_{HD}$ (compression grooves) per face were made both 0.3 mm in width. Otherwise in the same manner as Example 6, a negative electrode sheet was fabricated. Using this negative electrode sheet, a lithium secondary battery was fabricated in the same manner as Example 1.

EXAMPLE 11

Five lines (compression grooves) of high density part $N_{HD}$ were made per face. Otherwise, in the same manner as Example 10, a negative electrode sheet was fabricated. The respective high density lines $N_{HD}$ were formed in parallel with the centers of widths of the extra portions on the side not connected to the terminal, separated by the same distance. Using this negative electrode sheet, a lithium secondary battery was fabricated in the same manner as Example 1.

EXAMPLE 12

The two lines of high density part $N_{HD}$ (compression grooves) per face were made both 0.2 mm in width. Otherwise in the same manner as Example 6, a negative electrode sheet was fabricated. Using this negative electrode sheet, a lithium secondary battery was fabricated in the same manner as Example 1.

EXAMPLE 13

The two lines of high density part $N_{HD}$ (compression grooves) per face were made both 1.0 mm in width. Otherwise in the same mariner as Example 6, a negative electrode sheet was fabricated. Using this negative electrode sheet, a lithium secondary battery was fabricated in the same manner as Example 1.

EXAMPLE 14

The extra portions were made 4.0 mm in width and two lines of high density part $N_{HD}$ (compression grooves) per face were made both 1.5 mm in width. Otherwise in the same manner as Example 6, a negative electrode sheet was fabricated. The compression grooves forming resulted in flexural deformation of the negative electrode sheet. Thus, no lithium secondary battery was made.

EXAMPLE 15

The compression condition was modified so that the density $\rho N_{HD}$ of the high density parts $N_{HD}$ was 1.84 g/cm$^3$. Otherwise in the same manner as Example 6, two lines of high density part $N_{HD}$ (compression grooves) per face were formed in the extra portions. Using this negative electrode sheet, a lithium secondary battery was fabricated in the same manner as Example 1.

EXAMPLE 16

The compression condition was modified so that the density $\rho N_{HD}$ of the high density parts $N_{HD}$ was 1.88 g/cm$^3$. Otherwise in the same manner as Example 6, two lines of high density part $N_{HD}$ (compression grooves) per face were formed in the extra portions. Using this negative electrode sheet, a lithium secondary battery was fabricated in the same manner as Example 1.

EXAMPLE 17

The compression condition was modified so that the density $\rho N_{HD}$ of the high density parts $N_{HD}$ was 2.01 g/cm$^3$. Otherwise in the same manner as Example 6, two lines of high density part $N_{HD}$ (compression grooves) per face were formed in the extra portions. Using this negative electrode sheet, a lithium secondary battery was fabricated in the same manner as Example 1.

EXAMPLE 18

The compression condition was modified so that the density $\rho N_{HD}$ of the high density parts $N_{HD}$ was 2.10 g/cm$^3$. Otherwise in the same manner as Example 6, two lines of high density part $N_{HD}$ (compression grooves) per face were formed in the extra portions. While forming these compression grooves, the negative current collector sheet was partially damaged. Thus, no lithium secondary battery was made.

EXAMPLE 19

In the same manner as Example 6, two lines of high density part $N_{HD}$ (compression grooves) per face were formed in the extra portions. In this example, however, the high density lines $N_{HD}$ were formed over the entire length of the negative electrode. Using this negative electrode sheet, a lithium secondary battery was fabricated in the same manner as Example 1.

<Performance Tests>

About the lithium secondary batteries according to the respective examples, 60° C. post-storage capacity retention rates were measured by the following procedures. The results are shown in Table 1 to Table 5.

[60° C. Post-Storage Capacity Retention Rate]

The initial capacity and discharge capacity were measured by the method described below. From the resulting data, the 60° C. post-storage capacity retention rate was determined by the equation:

$$60° \text{ C. post-storage capacity retention rate (\%)} = (\text{post-storage capacity})/(\text{initial capacity}) \times 100$$

Initial capacities were measured by the following method. In an environment at a temperature of 25° C., each battery was subjected to charging at 1 C to 4.1 V followed by a 5 minute break followed by discharging at 1 C to 3.0 V followed by a 5 minute break. Subsequently, the battery was subjected to constant-current constant-voltage (CCCV) charging at 1 C to 4.1 V with a 0.1 C cut-off followed by CCCV discharging at 1 C to 3.0 V with a 0.1 C cut-off. The discharge capacity during this operation was measured and used as the initial capacity.

With respect to the post-storage capacity, after the lithium secondary battery adjusted at a temperature of 25° C. to 100% SOC was stored in an environment at 60° C. for 100 days, the capacity was measured under the same conditions as the initial capacity.

For each example, 10 lithium secondary batteries were obtained and subjected to the same measurements, and the mean of the obtained values was recorded.

The lithium secondary batteries according to Examples 1, 6 and 19 were further subjected to measurements of 50° C. cycle capacity retention rates as described below. The results are shown in Table 6.

[50° C. Cycle Capacity Retention Rate]

In an environment at a temperature of 25° C., each battery was subjected to charging at 1 C to 4.1 V followed by a 5 minute break followed by discharging at 1 C to 3.0 V followed by a 5 minute break. Subsequently, the battery was subjected to constant-current constant-voltage (CCCV) charging at 1 C to 4.1 V with a 0.1 C cut-off followed by CCCV discharging at 1 C to 3.0 V with a 0.1 C cut-off. The discharge capacity during this operation was measured and recorded as the initial capacity.

After the initial capacity was measured, in a thermostatic chamber at 50° C., the battery was subjected to 1000 cycles of CC charging and discharging at 2 C, and the discharge capacity after 1000 cycles was measured. The capacity retention rate (%) was determined by the equation:

$$\text{Capacity retention rate (\%)} = \text{discharge capacity after } 1000 \text{ cycles/initial capacity} \times 100$$

For each example, 5 batteries were obtained. The capacity retention rates of the respective five batteries were measured and their mean value was recorded.

TABLE 1

| Ex. | Width of extra portion (mm) | Width of compression groove (mm) | Number of compression grooves | $\rho N_{HD}$ (g/cm$^3$) | Post-storage capacity retention rate (%) | Surface area ratio of compression groove(s) (%) |
|---|---|---|---|---|---|---|
| 1 | 2.5 | — | — | — | 80.7 | 0 |
| 2 | 1.0 | — | — | — | 80.8 | 0 |
| 3 | 2.5 | 0.5 | 1 | 1.96 | 84.3 | 20 |
| 4 | 2.5 | 0.5 | 1 | 2.01 | 86.6 | 20 |
| 5 | 2.5 | 0.5 | 1 | 2.10 | — | 20 |

TABLE 2

| Ex. | Width of extra portion (mm) | Width of compression groove (mm) | Number of compression grooves | $\rho N_{HD}$ (g/cm$^3$) | Post-storage capacity retention rate (%) | Surface area ratio of compression groove(s) (%) |
|---|---|---|---|---|---|---|
| 3 | 2.5 | 0.5 | 1 | 1.96 | 84.3 | 20 |
| 6 | 2.5 | 0.5 | 2 | 1.96 | 92.9 | 40 |
| 7 | 2.5 | 0.5 | 3 | 1.96 | 94.3 | 60 |

TABLE 3

| Ex. | Width of extra portion (mm) | Width of compression groove (mm) | Number of compression grooves | $\rho N_{HD}$ (g/cm$^3$) | Post-storage capacity retention rate (%) | Surface area ratio of compression groove(s) (%) |
|---|---|---|---|---|---|---|
| 8 | 1.0 | 0.3 | 2 | 1.96 | 93.8 | 60 |
| 9 | 2.5 | 0.3 | 2 | 1.96 | 92.6 | 24 |
| 10 | 4.0 | 0.3 | 2 | 1.96 | 91.8 | 15 |
| 11 | 4.0 | 0.3 | 5 | 1.96 | 92.2 | 38 |

TABLE 4

| Ex. | Width of extra portion (mm) | Width of compression groove (mm) | Number of compression grooves | $\rho N_{HD}$ (g/cm$^3$) | Post-storage capacity retention rate (%) | Surface area ratio of compression groove(s) (%) |
|---|---|---|---|---|---|---|
| 12 | 2.5 | 0.2 | 2 | 1.96 | 84.5 | 16 |
| 8 | 1.0 | 0.3 | 2 | 1.96 | 93.8 | 80 |
| 6 | 2.5 | 0.5 | 2 | 1.96 | 92.9 | 40 |
| 13 | 2.5 | 1.0 | 2 | 1.96 | 93.2 | 80 |
| 14 | 4.0 | 1.5 | 2 | 1.96 | — | 75 |

TABLE 5

| Ex. | Width of extra portion (mm) | Width of compression groove (mm) | Number of compression grooves | $\rho N_{HD}$ (g/cm$^3$) | Post-storage capacity retention rate (%) | Surface area ratio of compression groove(s) (%) |
|---|---|---|---|---|---|---|
| 15 | 2.5 | 0.5 | 2 | 1.84 | 82.7 | 40 |
| 16 | 2.5 | 0.5 | 2 | 1.88 | 89.2 | 40 |
| 6 | 2.5 | 0.5 | 2 | 1.96 | 92.9 | 40 |

TABLE 5-continued

| Ex. | Width of extra portion (mm) | Width of compression groove (mm) | Number of compression grooves | $\rho N_{HD}$ (g/cm$^3$) | Post-storage capacity retention rate (%) | Surface area ratio of compression groove(s) (%) |
|---|---|---|---|---|---|---|
| 17 | 2.5 | 0.5 | 2 | 2.01 | 92.9 | 40 |
| 18 | 2.5 | 0.5 | 2 | 2.10 | — | 40 |

TABLE 6

| Ex. | Width of extra portion (mm) | Width of compression groove (mm) | Number of compression grooves | $\rho N_{HD}$ (g/cm$^3$) | Post-storage capacity retention rate (%) | Surface area ratio of compression groove(s) (%) |
|---|---|---|---|---|---|---|
| 1 | 2.5 | — | — | — | 80.7 | 90.6 |
| 6 | 2.5 | 0.5 | 2 | 1.96 | 92.9 | 90.4 |
| 19 | 2.5 | 0.5 | 2 | 1.96 | 93.0 | 86.4 |

As shown in Table 1, the lithium-ion secondary batteries according to Examples 1 and 2 having no compression grooves had post-storage capacity retention rates of approximately 80% regardless of the width of extra portion. On the contrary, the lithium-ion secondary batteries according to Examples 3, 4, 6 to 13, 15 to 17 and 19 all had clearly greater post-storage capacities as compared to the lithium-ion secondary batteries according to Examples 1 and 2. From Table 1 and Table 5, it can be seen that with increasing $\rho N_{HD}$ in the range of 1.84 g/cm$^3$ to 2.01 g/cm$^3$, the effect of improving the post-storage capacity retention rate increases. As shown in Table 1 and Table 2, the examples having at least two compression grooves tended to produce greater effects as compared to the examples having a single compression groove. As shown in Table 3, in comparison with Example 10 with the surface area ratio of high density part $N_{HD}$ (compression grooves) in the extra portion was 20% or lower, greater effects were obtained according to Examples 8, 9 and 11 having surface area ratios higher than 20%. The same tendency was observed in the examples shown in Table 4.

As shown in Table 6, with respect to Example 19 having high density parts $N_{HD}$ over the entire length of the negative electrode sheet, in comparison with Example 1 having no high density part $N_{HD}$, although some effect of increasing the post-storage capacity retention rate was obtained, the post-cycle capacity retention rate decreased. It is thought that with the high density parts $N_{HD}$ (compression grooves) provided over the entire length of the negative electrode sheet on the negative electrode active material layer edge in parallel to the edge, there were tendencies for poorer permeation of the electrolyte solution from the edge into the negative electrode active material layer and for poorer diffusion of lithium ions through the electrolyte solution, leading to the occurrence of inconsistent electrical reactions. On the contrary, with respect to Example 6 wherein the range of high density parts $N_{HD}$ (compression grooves) covered part of the entire length of the negative electrode sheet (more specifically, over the length of the outermost circumference), the post-storage retention rate clearly increased as compared with Example 1 and the post-cycle capacity retention rate obtained was comparable to Example 1.

The minor axes of the wound bodies (before pressed flat) measured 26.5 mm in Example 1 having no compression groove, 24.5 mm in Example 6 provided with compression grooves just over the length of the outermost circumference, and 24.2 mm in Example 19 provided with compression grooves over the entire length. These values support that in fabricating a wound electrode body, by forming compression groove(s), an effect to help maintaining the wound state is expected.

Although specific embodiments of the present invention have been described in detail above, these are merely for illustrations and do not limit the scope of the claims. The invention disclosed herein includes various modifications and changes made to the specific embodiments illustrated above.

REFERENCE SIGNS LIST 1 automobile (vehicle)
10 battery case
12 opening
14 lid
20 wound electrode body
25 non-aqueous electrolyte (non-aqueous electrolyte solution)
30 positive electrode (positive electrode sheet)
32 positive current collector sheet
34 positive electrode active material layer
35 positive current collector sheet self-overlapping portion
36 positive electrode active material layer-free portion
37 inner positive terminal
38 outer positive terminal
40 negative electrode (negative electrode sheet)
42 negative current collector sheet
44 negative electrode active material layer
442 compression groove
45 negative current collector sheet self-overlapping portion
46 negative electrode active material layer-free portion
47 inner negative terminal
48 outer negative terminal
50A, 50B separators (separator sheets)
100 lithium secondary battery

The invention claimed is:

1. A non-aqueous electrolyte secondary battery comprising an electrode body that comprises a positive electrode sheet and a negative electrode sheet, wherein
the positive electrode sheet comprises a positive current collector sheet, and a positive electrode active material layer placed on the positive current collector sheet,
the negative electrode sheet comprises a negative current collector sheet, and a negative electrode active material layer placed on the negative current collector sheet,
the positive electrode sheet and the negative electrode sheet are arranged so that the positive electrode active material layer and the negative electrode active material layer face each other,
the negative electrode active material layer comprises a face-to-face region $N_F$ that faces the positive electrode active material layer and a non-face-to-face region $N_{NF}$ that does not face the positive electrode active material layer, and
the non-face-to-face region $N_{NF}$ includes a high density part $N_{HD}$ having a density higher than that of the face-to-face region $N_F$.

2. The non-aqueous electrolyte secondary battery according to claim 1, wherein
the non-face-to-face region $N_{NF}$ comprises an outer portion $NS_{OUT}$ placed on an outer surface of the negative current collector sheet that is located further outside the outermost positive electrode active material layer in the electrode body, and
the outer portion $NS_{OUT}$ includes the high density part $N_{HD}$ on a periphery thereof.

3. The non-aqueous electrolyte secondary battery according to claim 1, wherein
the non-face-to-face region $N_{NF}$ comprises an extra portion $N_E$ spreading outward from the face-to-face region $N_F$, and
the extra portion $N_E$ includes the high density part $N_{HD}$.

4. The non-aqueous electrolyte secondary battery according to claim 1, wherein
the non-face-to-face region $N_{NF}$ comprises an outer extra portion $NS_{OUTE}$ placed on an outer surface of the negative current collector sheet that is located further outside the outermost positive electrode active material layer in the electrode body, spreading outward from the face-to-face region $N_F$, and
the outer extra portion $NS_{OUTE}$ includes the high density part $N_{HD}$.

5. The non-aqueous electrolyte secondary battery according to claim 1, wherein
the high density part $N_{HD}$ is formed on a periphery of the negative electrode sheet, and the periphery is covered on each face with the negative electrode active material layer up to the end edge of the negative current collector sheet.

6. The non-aqueous electrolyte secondary battery according to claim 1, wherein
the non-face-to-face region $N_{NF}$ comprises an extra portion $N_E$ that spreads outward from the face-to-face region $N_F$, and
the extra portion $N_E$ includes a high density part $N_{HD}$ in a form of a line that extends alongside the proximal edge of the face-to-face region $N_F$.

7. The non-aqueous electrolyte secondary battery according to claim 6, wherein
the extra portion $N_E$ includes the high density part $N_{HD}$ in a form of a plurality of lines arranged in parallel with one another.

8. The non-aqueous electrolyte secondary battery according to claim 1, wherein
the high density part $N_{HD}$ is formed by applying a negative electrode active material layer-forming composition to the negative current collector sheet, drying the composition applied, and locally pressing the dried composition.

9. The non-aqueous electrolyte secondary battery according to claim 1, wherein
the positive electrode sheet and the negative electrode sheet are both long in length, and
the electrode body is a wound electrode body obtained by winding the positive electrode sheet and the negative electrode sheet, which are overlaid, in the length direction.

10. A vehicle comprising the non-aqueous electrolyte secondary battery according to claim 1.

* * * * *